United States Patent
Woodcock et al.

(10) Patent No.: US 10,828,820 B2
(45) Date of Patent: Nov. 10, 2020

(54) EXTRUSION DIE SYSTEMS, DIE CHANGERS, AND RELATED METHODS

(71) Applicant: PSI-Polymer Systems, Inc., Conover, NC (US)

(72) Inventors: Glenn Woodcock, Conover, NC (US); David C. Woodcock, Newton, NC (US); James D. Baldwin, Hudson, NC (US)

(73) Assignee: PSI-Polymer Systems, Inc., Conover, NC (US)

( * ) Notice: Subject to any disclaimer, the term of this patent is extended or adjusted under 35 U.S.C. 154(b) by 390 days.

(21) Appl. No.: 15/819,601

(22) Filed: Nov. 21, 2017

(65) Prior Publication Data

US 2018/0345561 A1     Dec. 6, 2018

Related U.S. Application Data

(60) Provisional application No. 62/424,720, filed on Nov. 21, 2016.

(51) Int. Cl.
*B29C 48/68* (2019.01)
*B29C 48/691* (2019.01)
(Continued)

(52) U.S. Cl.
CPC ...... *B29C 48/6912* (2019.02); *B29C 48/2545* (2019.02); *B29C 48/2562* (2019.02);
(Continued)

(58) Field of Classification Search
CPC ............ B29C 48/2566; B29C 48/2567; B29C 48/271; B29C 48/695; B29C 48/2563;
(Continued)

(56) References Cited

U.S. PATENT DOCUMENTS

| 4,564,350 A | * | 1/1986 | Holmes | B29C 48/865 425/313 |
| 5,762,975 A | * | 6/1998 | Rockstedt | B29C 48/30 425/186 |

(Continued)

*Primary Examiner* — Joseph S Del Sole
*Assistant Examiner* — Lawrence D. Hohenbrink, Jr.
(74) *Attorney, Agent, or Firm* — J. Bennett Mullinax, LLC

(57) ABSTRACT

Extrusion die systems, die changers and related methods are provided herein. The die changer for changing of dies in and out of an extrusion line can include a housing having a main supply feed bore therethrough for directing a flowable material and a channel oriented transversely to the main supply feed bore. The die changer can include a slide plate movable through the channel and transverse to a direction of flow through the bore. The slide plate can include an elongate body having a first section and a second section. A first bore can extend through the first section of the elongate body of the slide plate and a second bore can extend through the second section of the elongate body of the slide plate. The slide plate of the die changer can be moved within the channel of the housing between a first position where the first bore in the first section of the elongate body of the slide plate is aligned with the main supply feed bore and a second position where the second bore in the second section of the elongate body of the slide plate is aligned with the main supply feed bore.

30 Claims, 19 Drawing Sheets

(51) Int. Cl.
*B29C 48/475* (2019.01)
*B29C 48/25* (2019.01)
*B29C 48/27* (2019.01)
*B29C 48/695* (2019.01)

(52) U.S. Cl.
CPC ........ *B29C 48/475* (2019.02); *B29C 48/2563* (2019.02); *B29C 48/2566* (2019.02); *B29C 48/2567* (2019.02); *B29C 48/271* (2019.02); *B29C 48/695* (2019.02)

(58) Field of Classification Search
CPC ............ B29C 48/6912; B29C 48/2562; B29C 48/2545; B29C 48/475
USPC ...................................... 264/177.16; 425/190
See application file for complete search history.

(56) References Cited

U.S. PATENT DOCUMENTS

| | | | |
|---|---|---|---|
| 9,309,974 B1* | 4/2016 | Woodcock | F16J 15/3236 |
| 2003/0052427 A1* | 3/2003 | Kossl | B29C 48/09 |
| | | | 264/39 |
| 2004/0200784 A1* | 10/2004 | Jones, III | B01D 29/03 |
| | | | 210/767 |
| 2008/0018010 A1* | 1/2008 | Princell | B29C 48/09 |
| | | | 264/39 |

* cited by examiner

EXTRUSION DIE SYSTEMS, DIE CHANGERS, AND RELATED METHODS

RELATED APPLICATION

The presently disclosed subject matter claims the benefit of U.S. Provisional Patent Application Ser. No. 62/424,720, filed Nov. 21, 2016, the disclosure of which is incorporated herein by reference in its entirety.

TECHNICAL FIELD

The present subject matter generally relates to dies systems and die changers used in the extrusion of molten material, such as polymer. More specifically, the present subject matter relates to extrusion die systems and extrusion die changers that permit the efficient changing of dies in and out of an extrusion line.

BACKGROUND

Polymer extrusion systems are well known and used for applications such as the manufacture of extruded polymer components. In a typical application, polymer feedstock particles are combined and heated in an extruder device to produce a stream of molten polymer. The polymer extrudate is then driven under pressure to an appropriate downstream module. As one example, the polymer extrudate can be fed to a die to shape the polymer into a sheet, tube or other desired profile. In a typical polymer processing system, an extruder feeds polymer extrudate through a filter to improve its quality and uniformity before passing it through to the die.

Depending on the nature of the polymer extrusion process, it is often the case that the die will need to be changed after running for the extrusion process for a certain period of time. Such changes may be necessitated due to the change in the type of die being used or to permit a proper cleaning of the die components after a product line change, such as a size change, material change, or color change, or an extended run of the polymer extrusion process. Such changes, however, can cause an extrusion line to be shut down for an extended period of time while the old die is removed and the new die installed. Current manual die changing processes can take anywhere from two (2) up to eight (8) hours while the line is required to be shut down resulting in significant production loss. Additionally, before the line can operate again the die must be heated to an appropriate temperature for operation. For foamed polymer extrusion, for example, the extruder must be heated back up from a much cooler operating temperature. The cooler operating temperature is required for making good quality low density operating output, i.e., foamed polymer. The temperature needs to be heated upward from the cooler operating temperature to achieve a proper melt temperature. This changing of temperatures can thus cause considerable scrap production and expense while running. In particular, the changing of the temperature to a melt temperature and then back down to an operating temperature can take up to an hour thus causing considerable scrap, lost production, and expense. Each time an extrusion line is taken offline a plethora of problems can arise. As an example, if an extrusion line is shut down too long, then the polymer can harden if cooled, or in the alternative, burn if continuously heated. In such cases, a cleaning of the entire system may be necessitated.

Thus, it is widely accepted among persons skilled in the art that, despite past efforts, an ongoing need exists to provide systems, apparatuses and methods rapidly to exchange dies within an extrusion line.

SUMMARY

The present subject matter provides dies systems and die changers used in the extrusion of molten material, such as one or more polymers. More specifically, the present subject matter relates to extrusion die systems and extrusion die changers that permit the rapid and efficient changing of dies in and out of an extrusion line by performing die changes faster and allowing continuous material production resulting in less labor, less scrap, material & cost savings as well as less downtime. Methods related to the use of the dies and die changers disclosed herein are also provided.

Thus, it is an object of the presently disclosed subject matter to provide extrusion die systems and extrusion die changers as well as methods related thereto that can facilitate the changing of dies within an extrusion line. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1:
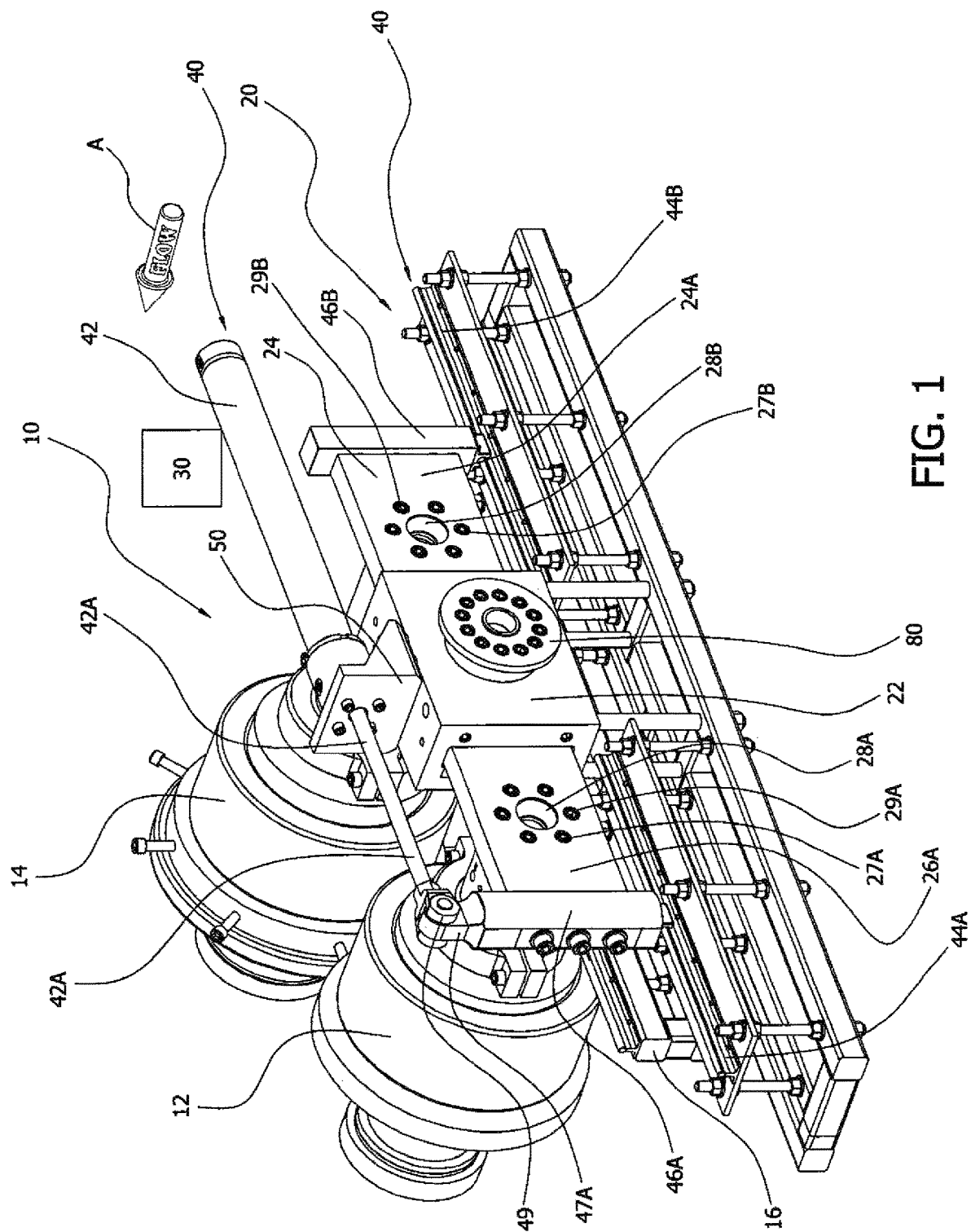
FIG. 1 illustrates a perspective view of an embodiment of an extrusion die system that uses an embodiment of a die changer according to the present subject matter.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, when a layer or coating is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

Apparatuses such as extrusion die systems and die changers that facilitate the processing of a fluid, including, but not limited to a molten polymer, are described herein. Each apparatus can comprise a housing with one main supply feed bore and one slide plate with two discharge bores therein. The slide plate can be used to change dies in and out of an extrusion line. Each of the two discharge bores can be mechanically configured to an extrusion die at the slide plate. There are two positions used to direct the main supply feed flow through one of the two discharge channels, as desired, in which the slide plate is shifted accordingly by a slide plate shifter, such as a hydraulic cylinder. Such a hydraulic cylinder can be connected to the slide plate with a clevis pin. The slide plate shifter can include linear bearings and one or more rails to support slide plates and the hydraulically actuated moving parts. The housing can include compression springs that engage a connector ring clamp that engages the main supply feed bore and tapered ring segments of a connector ring can load the tapered ring segments to push against a seal to produce an initial polymer seal load to ensure a good contact between the seals and the slide plate. When the extruder starts to build pressure, the tapered ring segments translate the pressure into an axial seal load such that the higher the internal pressure is the tighter the seal in a manner similar to the seals disclosed and described in U.S. Pat. No. 7,147,774 B2, the entirety of which is incorporated herein by reference.

When the process that uses the apparatuses described herein requires a die change, a trained operator can first shut down and depressurizes the extrusion line to stop molten plastic flow. Alternatively, a trained operator can divert the molten plastic flow in the extrusion line prior to entering the die changer so that the extrusion line can continuously run during the die change. The in line die can then be transferred out of line by activating the hydraulic cylinder. Thereby, in less than one minute, a clean new die is introduced into the extrusion line as the previous used die comes out. In some embodiments, this operation can be performed while the extrusion line is shut down and depressurized due to an interruption in the melt flow during the shift. Alternatively, the system can include a diverter or by-pass valve so that the operation can be performed while the extrusion line is operating but the die and die changer are depressurized due to the diversion or by-passing of the melt flow during the shift. In such embodiments, condenser devices, such as pinch rollers, can be provided to bleed gas from and collapse the foam to create a denser polymer with less volume for more easily handled for waste disposal or recycling purposes. Thereby, with the die changer apparatus disclosed herein, all manual labor for connecting a new die can be accomplished with the line running and the die change process can take less than 1 minute. The frequency of die changes will depend upon the end product requirements. For example, in blown film extrusion, it will be required to change out dies depending on the bubble diameter required for the end product. The systems, apparatuses and methods of the present disclosure are described in more detail below with reference to FIGS. 1-9B.

Figure 2:
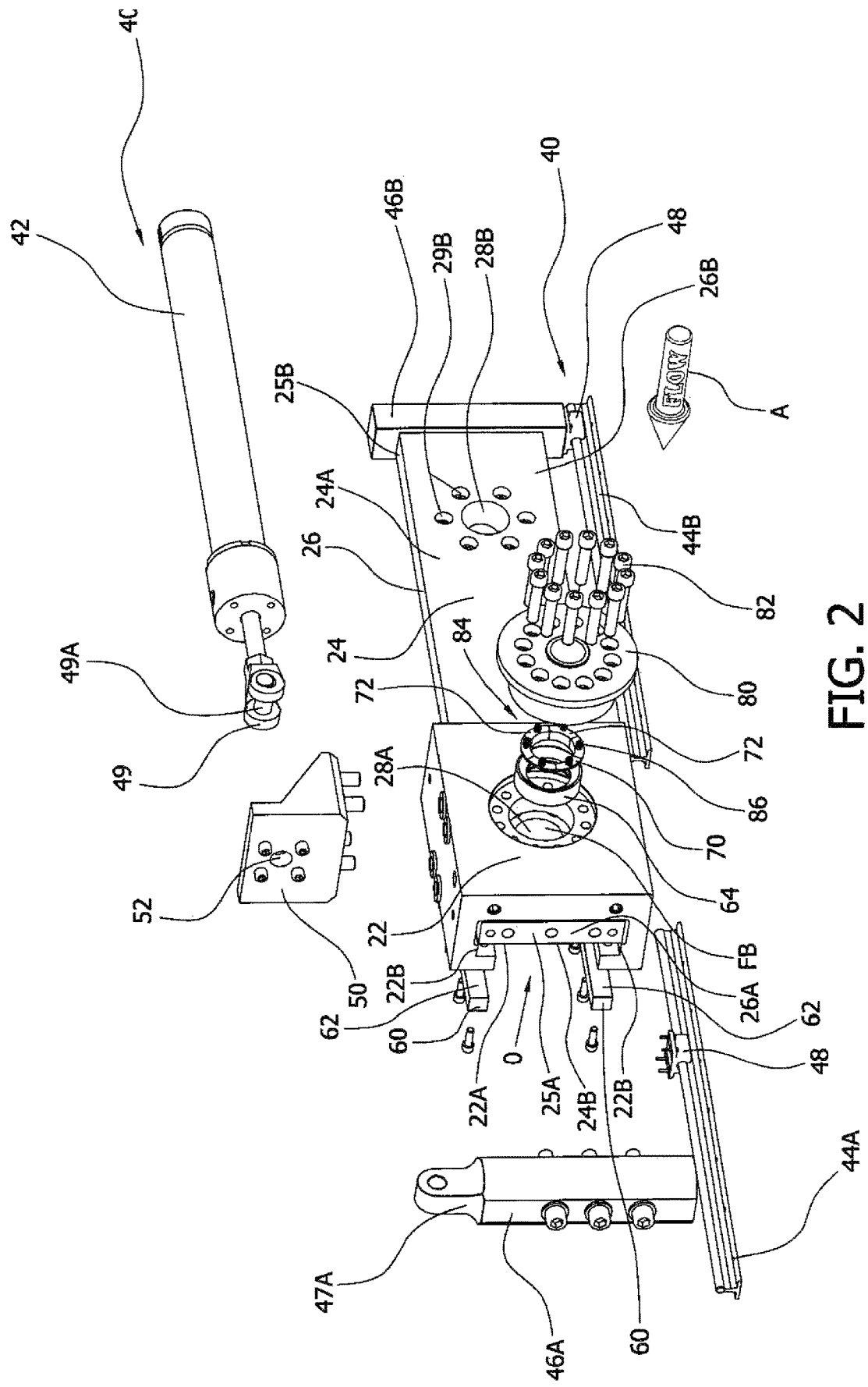
FIG. 2 illustrates an exploded perspective view of an embodiment of a die changer according to the present subject matter.
Figure 3:
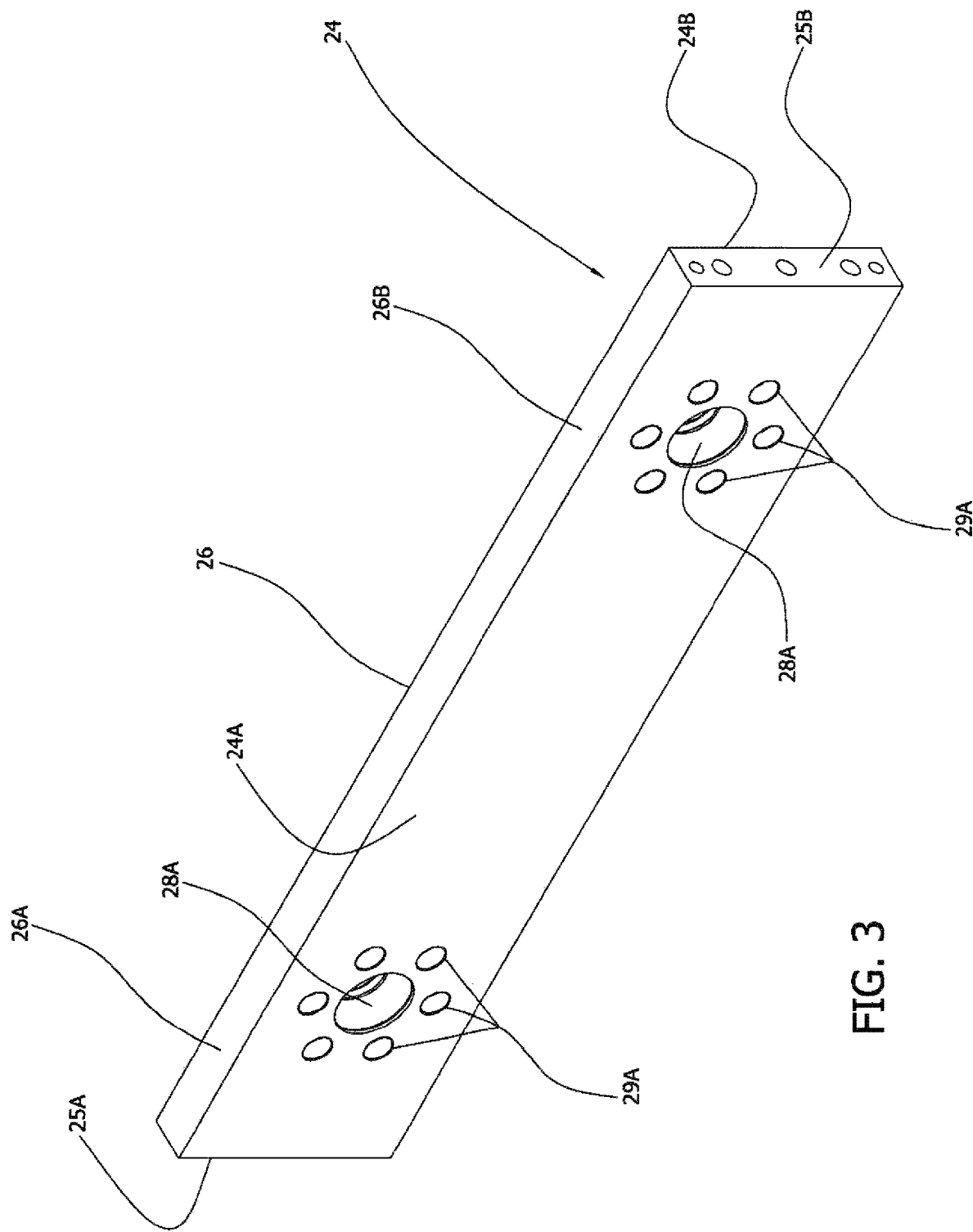
FIG. 3 illustrates a perspective view of an embodiment of a slide plate of a die changer according to the present subject matter.

Referring to FIGS. 1-4, an embodiment of an extrusion die system, generally designated 10, for use in a flowable material processing systems, such as a polymer processing system is provided. The extrusion die system 10 can comprise a first die 12 and a second die 14 that can be secured to an embodiment of a die changer, generally designated 20. As shown in FIGS. 1 and 2, the die changer 20 can comprise a housing 22 having a main supply feed bore FB therethrough for directing a flowable material (the direction of which is shown by arrow A), such as for example, a flow of polymer, and a channel 22A that can be oriented transversely to the main supply feed bore FB. The die changer 20 can also comprise a slide plate 24 movable through the channel 22A and transverse to a direction of flow through the main supply feed bore FB. The slide plate 24 as shown in FIGS. 2 and 3 can comprise an upstream slide plate surface 24A that faces the main supply feed bore FB and a downstream slide plate surface that faces the first and second dies 12, 14. The slide plate 24 can also comprise an elongate body 26 that can comprise a first section 26A and a second section 26B, a first bore 28A can extend through the first section 26A of the elongate body 26 and a second bore 28B can extend through the second section 26B of the elongate body 26. The die changer 20 will be described in more detail below.

Figure 4:
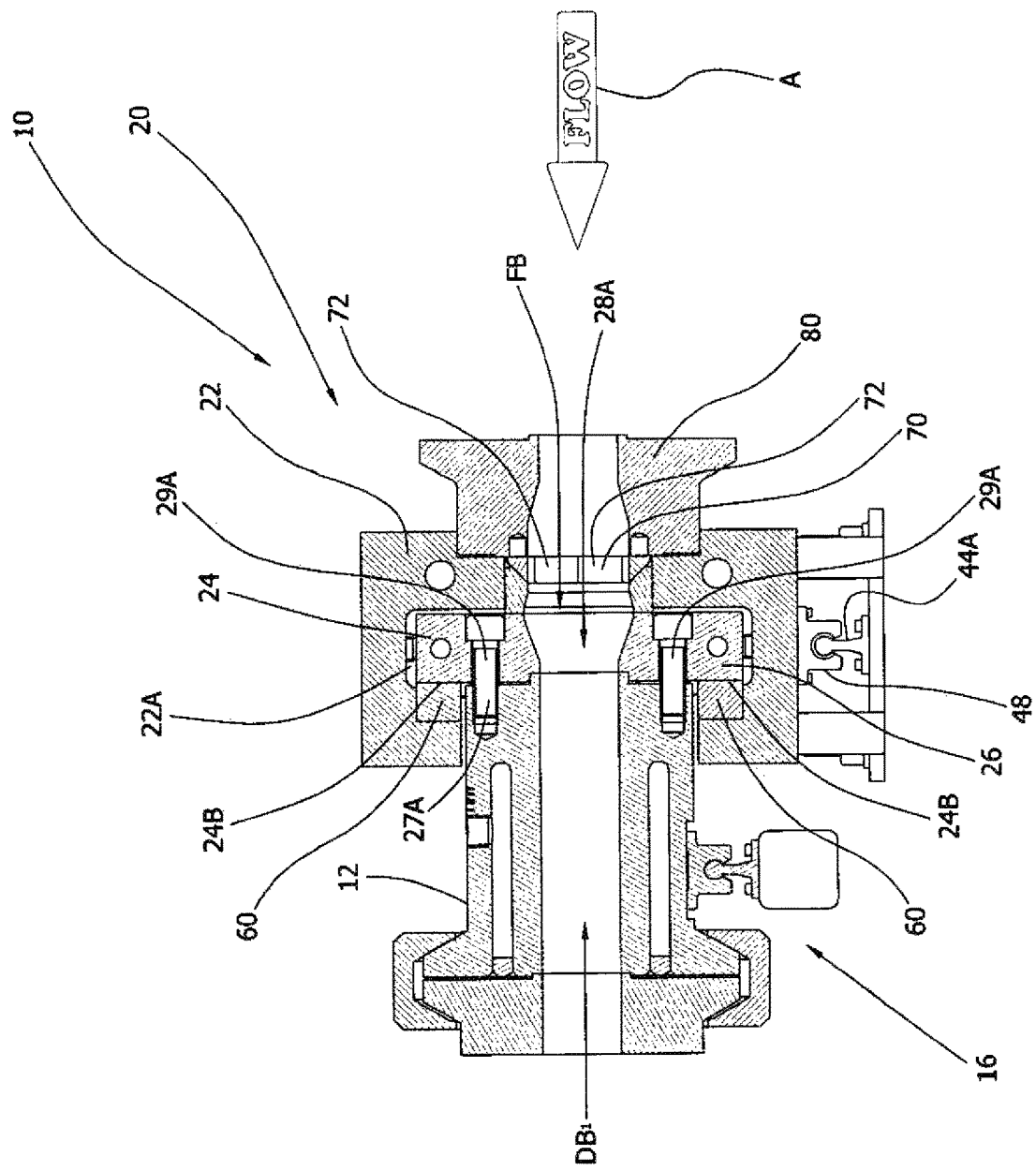
FIG. 4 illustrates a cross-sectional view of an embodiment of an extrusion die system that uses an embodiment of a die changer with a die secured thereto according to the present subject matter.

The first die 12 of the extrusion die system 10 can be securable to the slide plate 24 at the downstream slide plate surface 24B so that it can be aligned with the first bore 28A in the first section 26A of the elongate body 26 of the slide plate 24. The alignment can depend on the configuration of the first die 12. For example, in some embodiments as shown in FIG. 4, the bore $DB_1$ of the first die 12 can have an axis that aligns with an axis of the first bore 28A so that a generally unimpeded flow of material exists. The first and second dies 12, 14 can each be supported by a support 16 as shown in FIG. 4 that provides the ability to maneuver the respective dies 12, 14 in and out of the extrusion line. The support 16 can comprise at least one rail 18 on a support base 16A on which the first and second dies 12, 14 ride as the slide plate 24 is moved between the first position and the second position.

The second die 14 of the extrusion die system 10 can be securable to the slide plate 24 at the downstream slide plate surface 24B so that it can be aligned with the second bore 28A in the second section 26A of the elongate body 26 of the slide plate 24. Similarly, in some embodiments, the bore of the second die 14 can have an axis that aligns with an axis of the second bore 28A so that a generally unimpeded flow of material.

Thus, in the extrusion die system shown in FIGS. 1 and 4, the slide plate 24 of the die changer 20 can be moved within the channel 22A of the housing 22 to a first position where the first bore 28A in the first section 26A of the elongate body 26 of the slide plate 24 and the first die 12 are aligned with the main supply feed bore FB so that the flowable material is directed through the first bore 28A and the first die 12. Similarly, the slide plate 24 of the die changer 20 can be moved within the channel 22A of the housing 22 to a second position where the second bore 28B in the second section 26B of the elongate body 26 of the slide plate 24 and the second die 14 are aligned with the main supply feed bore FB so that the flowable material is directed through the second bore 28B and the second die 14. In this manner, the slide plate can be moved back and forth between the first position and the second position. This movement can have a multitude of benefits. For example, it permits the extrusion die that is not in use, i.e., not in the extrusion line to be clean, repaired, or otherwise worked on without having a lengthy shut down of the extrusion line. It can also allow for the exchange of a plurality of different dies without the need for a lengthy delay caused by the removal of the old die from the extrusion line and the insertion of the new die. Instead, the changing of a die can occur in the "off line" spot on the slide plate. Once the new die is installed thereon, the die changer can quickly and easily move the new extrusion die into an in line position.

The die changer 20 can further comprise a controller 30, shown in FIG. 1 schematically as a box, and a slide plate shifter 40 that can be controlled by the controller 30. The controller 30 can be any number of control devices such as a computer, a microcomputer, a smart device, a PLC, or the like. Similarly, the controller 30 can be the main control unit for the extrusion process system. The controller 30 can move the slide plate 24 back and forth between the first position and the second position using the slide plate shifter 40. The slide plate shifter 40 can comprise a variety of mechanism that can be used to safely, securely, and reliably move the slide plate 24 between the first position and the second position.

For example, in some embodiments, the slide plate shifter 40 can comprise a hydraulic cylinder 42 having an extendable and retractable arm 42A secured to the slide plate 24 to move the slide plate 24 between the first position and the second position. Further, in some embodiments, the slide plate shifter 40 comprises at least one rail 44A, 44B on which the slide plate 24 rides as the slide plate 24 is moved between the first position and the second position. For example, the die changer 20 can comprise a first rail 44A position close to one side of the housing 22 and a second rail 44B positioned in proximity to an opposing side of the housing 22. The first and second rails 44A, 44B can be in parallel alignment within the same plane. For instance, in some embodiments, the first and second rails 44A, 44B can extend along a same axis line. In some embodiments, a single rail may be present as a portion of a slide plate shifter.

Additionally, the die changer can further comprise a first end cap 46A on a first end 25A of the slide plate 24 and a second end cap 46B on a second end 25B of the slide plate 24. The first end cap 46A and the second end cap 46B can have linear bearings 48 attached thereto that can engage the first and second rails 44A, 44B. For example, as shown in FIGS. 1 and 2, the linear bearings 48 attached to second end cap 46A can engage and ride along the rail 44A and the linear bearings 48 attached to second end cap 46B can engage and ride along the rail 44B. The length and spacing of the first and second rails 44A, 44B can be such that the linear bearings 48 attached to first and second end caps 46A, 46B will stay engaged on the respective first and second rails 44A, 44B as the slide plate 24 moves back and forth between the first and second position.

Further, the first end cap 46A can have a top portion 47A that can be engaged by the arm 42A of the hydraulic cylinder 42 of the slide plate shifter 40. For example, the arm 42A can comprise a clevis 49 on an end distal from the body of the hydraulic cylinder 42. The clevis 49 can engage the top portion 47A of the first end cap 46A. For instance, a clevis pin 49A can extend into an aperture in the top portion 47A of the first end cap 46A. The controller 30 can initiate movement of the arm 42A of the hydraulic cylinder 42 which through the engagement of the clevis 49 with the top portion 47A of the first end cap 46A either pushes or pulls the slide plate 24 with the linear bearings 48 on the first and second caps 46A, 46B provide guidance and support through their engagement with the rails 44A, 44B for the movement of the slide plate 24.

In some embodiments, the hydraulic cylinder 42 can be mounted so that the arm 42A extends and retracts in a motion that parallels the motion of the slide plate 24. For example, in some embodiments, the arm 42A may extend and retract in a horizontal motion. In some embodiments, the arm 42A may extend and retract in a vertical motion. To facilitate the movement of the arm 42A, support and guidance of the movement may be provided thereto. For example, as shown in FIGS. 1 and 2, the die changer 24 can further comprise a cylinder mounting bracket 50 secured to the housing 22. In particular, the cylinder mounting bracket 50 can be mounted on a top portion of the housing 22. The cylinder mounting bracket 50 can have an aperture 52 through which the arm 42A of the cylinder 42 passes to provide support and guidance to the movement of the arm 42A of the cylinder 42 as needed.

As shown in FIG. 3, the slide plate 24 of the die changer 20 can have a plurality of first fastening apertures 29A that reside proximal the first bore 28A for securing the first die 12 to the slide plate 24 and a plurality of second fastening apertures 29B that reside proximal the second bore 28B for securing the second die 14 to the slide plate 12. The first die 12 can be secured to the slide plate 24 with axially oriented fastening members 27A that can engage the first fastening apertures 29A and the second die 12 can be secured to the slide plate 24 with axially oriented fastening members 27B that can engage the second fastening apertures 29B. In some embodiments, the fastening members 27A, 27B can be threaded bolts and the apertures 29A, 29B can be threaded so that the bolts can be screwed into the fastening apertures 29A, 29B. In some such embodiments, the fastening apertures 29A, 29B may not pass through the entire slide plate 24. In some such embodiments, the fastening apertures 29A, 29B may pass through the entire slide plate 24. In some embodiments, the fastening members can be 27A, 27B can be threaded bolts that pass through a portion of the apertures 29A, 29B and can be engaged by respective nuts that can resided within a larger portion of the fastening apertures 29A, 29B that opens on the upstream slide plate surface 24A of the slide plate 24 that is sized for receiving the nuts so that the upstream slide plate surface 24A remains flush.

The channel 22A of the housing 22 can form an opening O on the downstream side of the housing 22 that can permit the movement of the first die 12 and the second die 14 in and out of position within the housing 22. The housing 22 can have downstream wear rails 60 installed to protect the housing 22 and the first and second dies 12, 14 during movement of the slide plate 24. Shims 62 can be installed behind the downstream wear rails 60 between the downstream wear rails 60 and the housing 22. The channel 22A can also form opposing grooves 22B for receiving and guiding upper and lower sides of the slide plate 24. The opposing grooves 22B can aid in holding the slide plate 24 within the channel 22A.

As shown in FIG. 2, an upstream seal ring 64 can be annularly disposed about a central bore axis of the main supply feed bore FB. The upstream seal ring 64 can comprise first and second opposing upstream seal surfaces, the first upstream seal surface facing downstream for sealably contacting the upstream slide plate surface 24A, and the second upstream seal surface angled with respect to the bore axis of the main supply feed bore FB. A plurality of separate and individual ring segments 72 can be arranged in frictional engagement with each other to form a segmented connector ring 70 that can also be annularly disposed about the bore axis of the main supply feed bore FB. Each ring segment 72 can comprise a tapered ring surface that can be generally complementarily angled relative to and sealably contacting the second upstream seal surface of the upstream seal ring 64. The ring segments 72 can, for example, be constructed of a metal. In some embodiments, for example, the ring segments 72 can be constructed of a steel. An annular connector ring clamp 80 can be installed to contact the plurality of ring segments 72. Thereby, the ring segments 72 can be axially interposed between the upstream seal ring 64 and the connector ring clamp 80. The connector ring clamp 80 can be secured to the housing 22 with axially oriented fastening members 82. The connector ring clamp 80 can include a biasing device generally designated 84 that can engage the ring segments 72 for axially biasing the ring segments 72 against the upstream seal ring 64. As shown in FIG. 2, the biasing device 84 can comprise a plurality of biasing components in the form of compression springs 86 circumferentially arranged about the bore axis. In some embodiments, each ring segment 72 can be engaged by a corresponding compression spring 86. In some embodiments, each ring segment 72 can be engaged by multiple compression springs 86. Compression springs 86 can produce a small initial seal load to ensure a good contact between the seals and the slide plate 24. When the extruder starts to build pressure, the taper ring segments 72 can translate the pressure into an axial seal load, such that as the internal pressure becomes higher, the seal becomes tighter. Because the seal is pressure-activated and there is no pressure for the slide plate's stroke, there is virtually no friction and thus no seal or slide plate wear.

Figure 5:
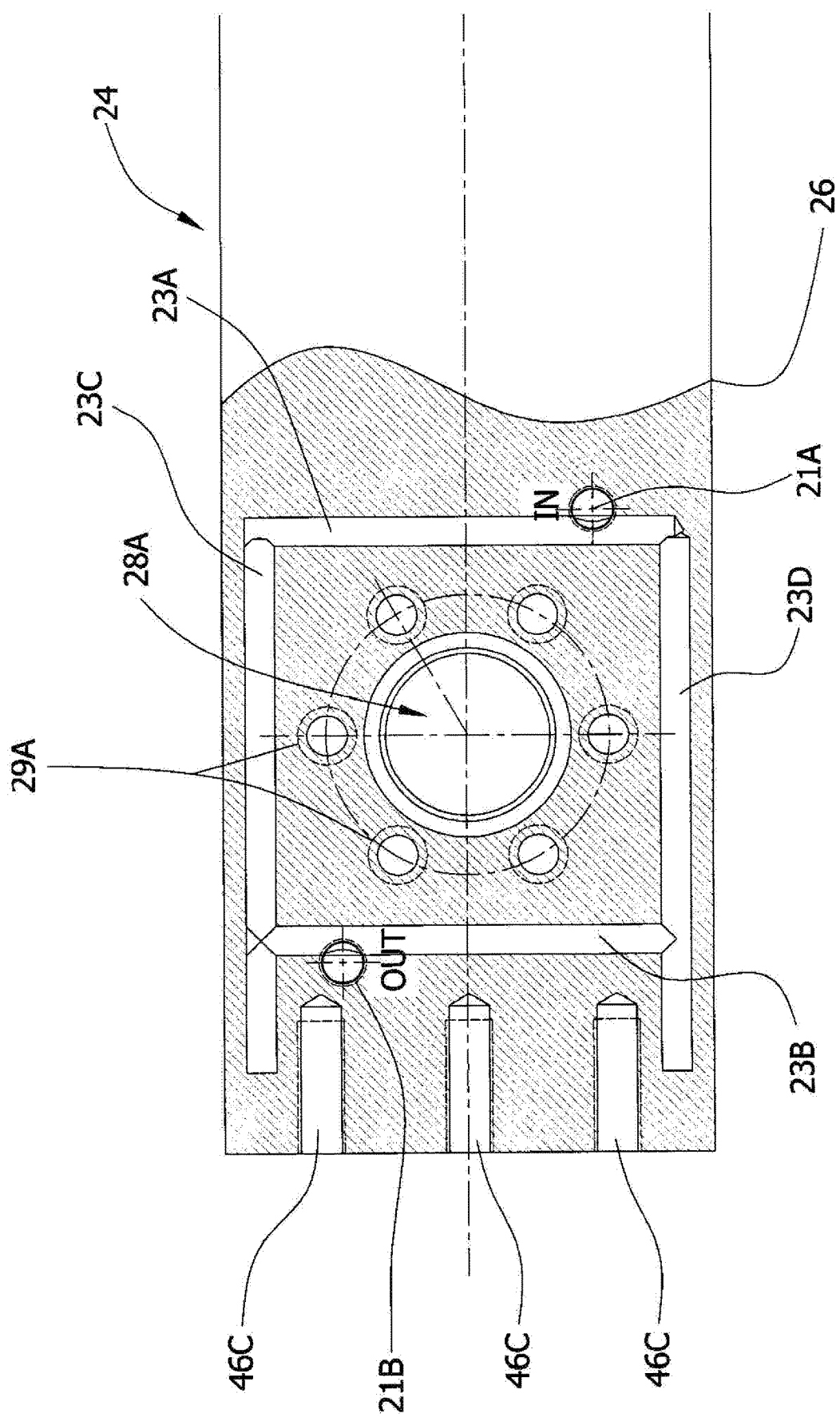
FIG. 5 illustrates a partial cross-sectional view of an embodiment of a die changer according to the present subject matter.
Figure 6A:
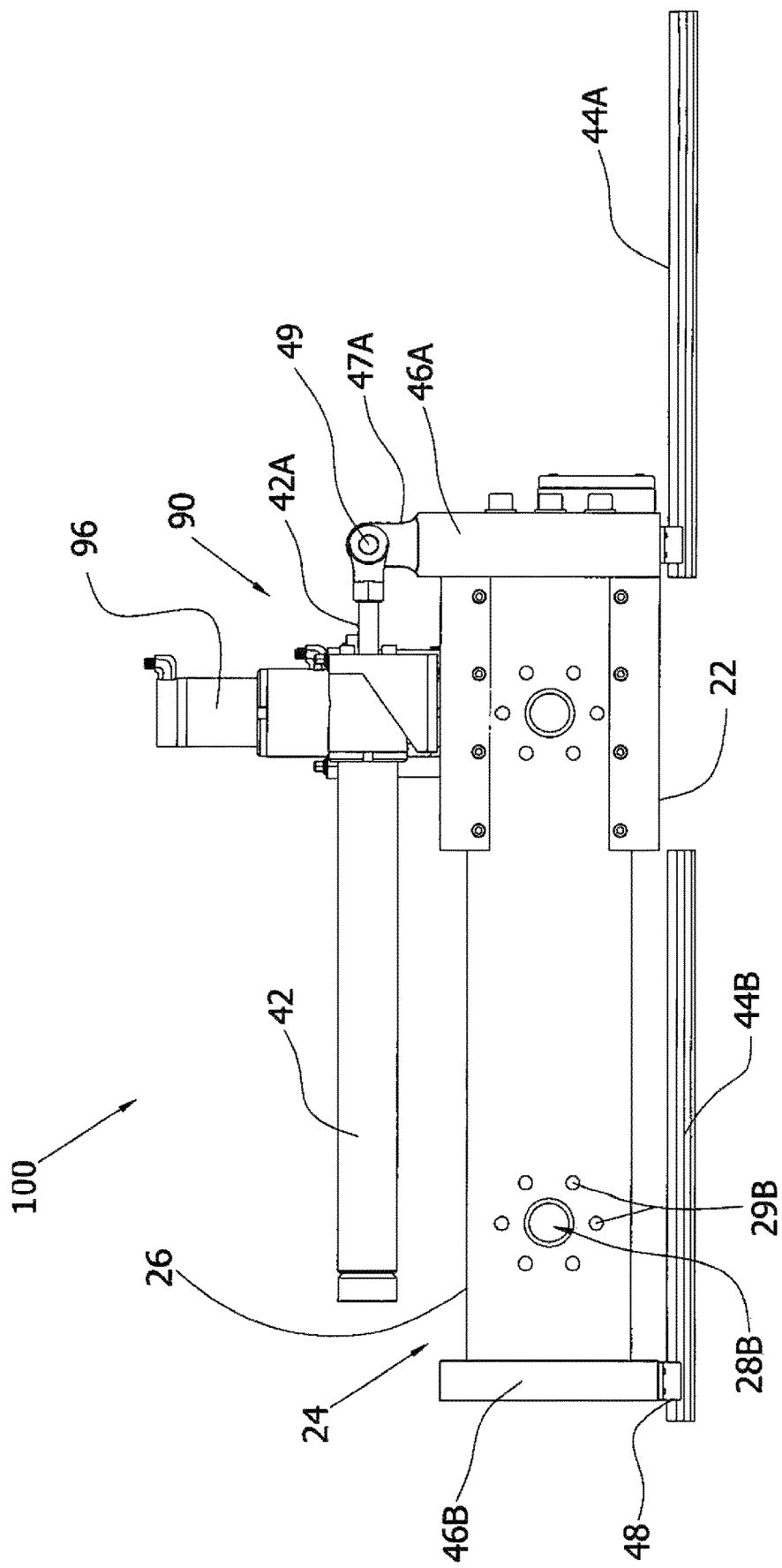
FIG. 6A illustrates rear view of another embodiment of an extrusion die system that uses an embodiment of a die changer comprising a diverter according to the present subject matter.
Figure 6B:
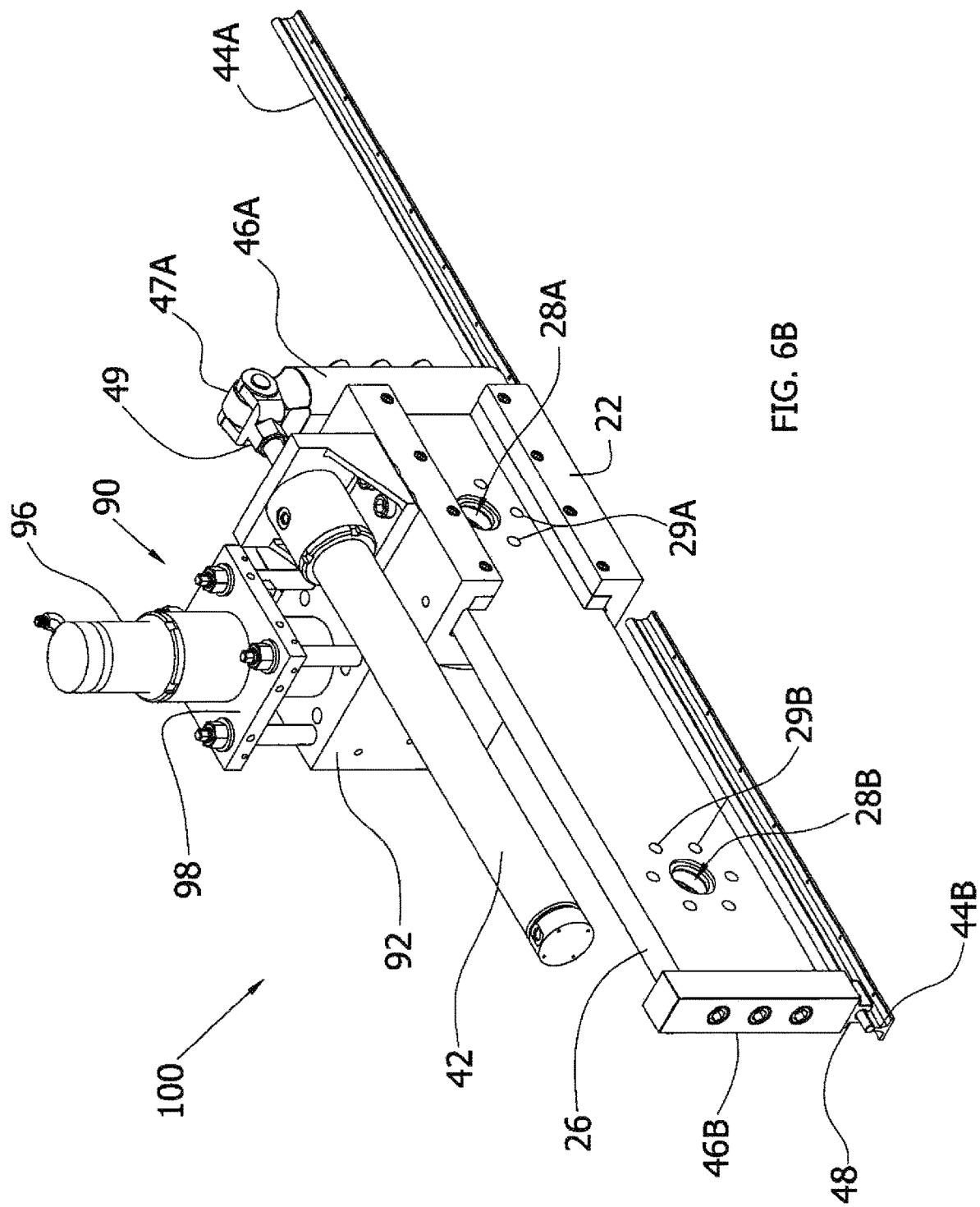
FIG. 6B illustrates perspective view of the embodiment of the extrusion die system according to FIG. 6A.

To ensure proper flow of the molten material through the bores 28A, 28B in the slide plate 24 once the flowable material begins to flow through the bores 28A, 28B, portions of the slide plate 24 can be heated so that the walls of the bores 28A, 28B are heated to a proper temperature. For example, in some embodiments, one or more heat transfer conduits can form a continuous flow channel around the bores 28A, 28B to heat the walls of the bores 28A, 28B. As shown in FIG. 5, one or more conduits 23A, 23B, 23C, 23D can be formed around a perimeter of the bore 28A with the conduits 23A, 23B, 23C, 23D can be connected to permit a flow of heated liquid around the respective bore 28A when needed to transfer heat from the heated liquid to surrounding portion of the slide plate 24 to heat the walls of the bore 28A. The shape of the connected conduits 23A, 23B, 23C, 23D can vary. For example, the conduits can form a circular shape, a triangular shape or a rectangular shape, like the square shape shown in FIG. 5. The conduits 23A, 23B, 23C, 23D can surround the bore 28A to ensure proper and even heating of the walls of the bore 28A. The connected conduits 23A, 23B, 23C, 23D can be positioned around the perimeter of the bore 28A and the fastening apertures 29A. An inlet 21A can be formed on one side of the flow channel formed by the conduits 23A, 23B, 23C, 23D and an outlet 21B can be formed on a second side of the flow channel.

Heated liquid, such as heated oil or water can be pumped into the flow channel through the inlet 21A so that the heated liquid flows through all of the conduits 23A, 23B, 23C, 23D and out of the outlet 21B. In this manner, the heated liquid can transfer heat to the slide plate and pumped out through the outlet 21B before the heated liquid is depleted of its higher temperature and recycled for reheating and pumping back through the heat transfer flow channel surrounding the bore 28A.

Referring to FIGS. 6A-8B, another embodiment of a die changer 100 is provided that can be used in an extrusion die system within flowable material processing systems. The die changer 100, as in the embodiments described above, can comprise a housing 22 having a main supply feed bore therethrough for directing a flow of material and a channel 22A that can be oriented transversely to the main supply feed bore. The die changer 20 can also comprise a slide plate 24 as described above that is movable through the channel 22A and transverse to a direction of flow through the main supply feed bore. The slide plate 24 can comprise an elongate body 26 with a first bore 28A with fastening apertures 29A for securing a first extrusion die on the downstream side of the slide plate 24 can extend through a first section of the elongate body 26 and a second bore 28B with fastening apertures 29B for securing a second extrusion die on the downstream of the slide plate 24 can extend through a second section of the elongate body 26.

The die changer 20 can further comprise a diverter, or a by-pass, valve 90 that can be secured on the upstream side of the housing 22 of the die changer 20 upstream of the slide plate 24. Using the fastening apertures 29A, 29B, the slide plate 24 can have extrusion dies secured on the downstream side of the slide plate 24 such that flowable material from the processing system passes through the diverter valve 90 before the flowable material reaches a respective bore 28A, 28B of the slide plate 24 before entering the respective extrusion die. The diverter valve 90 can be used to allow the processing system to continuously run under operating conditions during an extrusion die change and prevent pressure from being exerted against the die changer and slide plate components.

In some embodiments as shown in FIGS. 6A-8B, the diverter valve 90 can comprise a housing 92 having a material flow bore 92A that extends through the diverter housing 92 and is alignable with a flow passage through a processing system through which the material being processed can flow. The material flow bore 92A is also alignable with the material flow bore through the die changer housing 22 and one of the bores 28A, 28B of the slide plate 24, when the slide plate 24 is moved into proper position to bring a respective extrusion die online in the flowable material processing system. For example, as shown in FIGS. 7A-8B, the diverter housing 92 can be secured to an annular connector ring clamp 80 that can be secured to the die changer housing 22 so that the flow bores in the various components are aligned. For example, upon securing the diverter housing 92 to the annular connector ring clamp 80, the flow bore 92A through the diverter housing 92 is aligned with the bores through the annular connector ring clamp 80 and the various seal components that allow the respective bores 28A, and 28B in the slide plates 24 to be properly aligned and sealed when material flows therethrough. For example, as explained above, the annular connector ring clamp 80 can contact biasing devices, such as springs 86, and a segmented connector ring 70 that can comprise a plurality of ring segments 72 that push against an upstream seal ring 64 and the connector ring clamp 80. As stated above, the pressure of the flowable material can push against the ring segments 72 that, in turn, push against the seal ring 84 to form a seal against the slide plate 24.

Figure 8A:
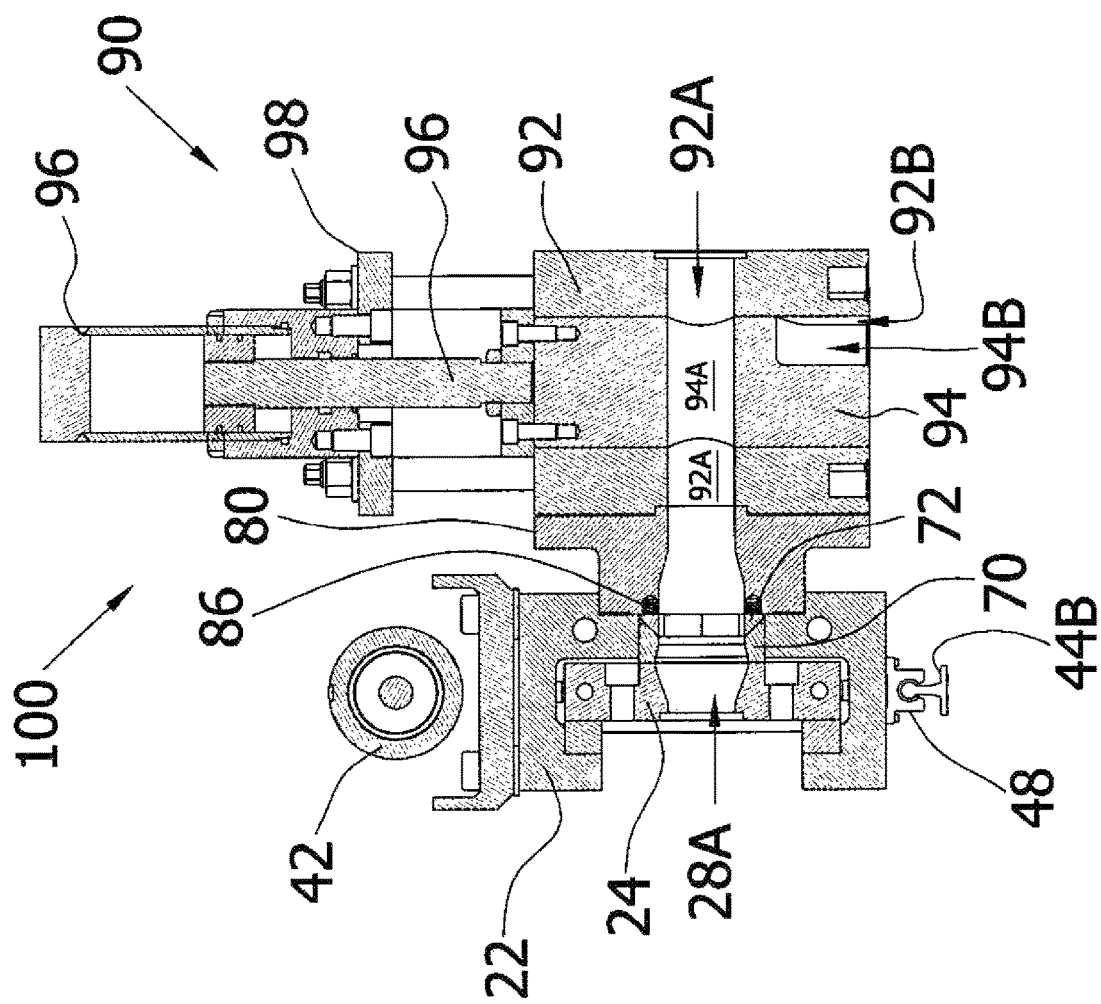
FIG. 8A illustrates a cross-sectional side view of the embodiment of the extrusion die system according to FIG. 6A, with the diverter in a material flow through position.
Figure 8B:
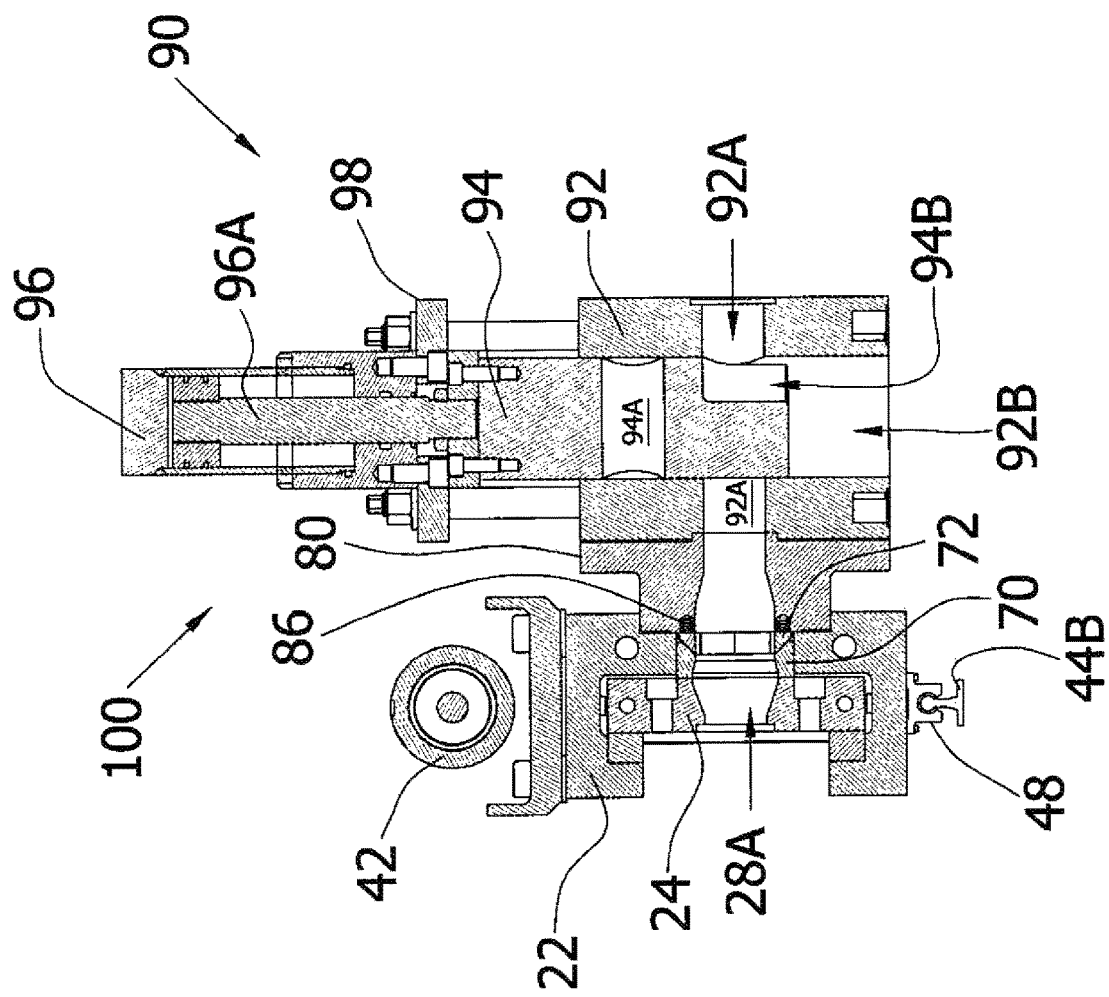
FIG. 8B illustrates a cross-sectional side view of the embodiment of the extrusion die system according to FIG. 6A, with the diverter in a diversion through position.

The diverter housing 92 also comprises a piston aperture 92B that transversely intersects the material flow bore 92A. For example, the piston aperture 92B can extend through and perpendicularly intersect the material flow bore 92A. The diverter valve 90 can comprise a piston which comprises a piston head 94 that is configured to movably fit within the piston aperture 92B and piston rod 96A to which the piston head 94 is secured at a distal end and which extends outward from a drive member 96, which can be a hydraulic cylinder as shown in FIGS. 68-8B. The piston head 94 can comprise a material flow through bore 94A that extends through the piston such that when the piston 94 is moved to a proper position by the drive member 96, the material flow through bore 94A is aligned with the material flow bore 92A within the diverter housing 92 to allow material to flow from the flowable material processing system through the diverter 90 and die changer 100 to a respective extrusion die. The piston head 94 can also comprise a diversion bore 94B that can be used to divert material that is received from the processing system out of the system to allow for a pressure-free extrusion die change while keeping the material flowing through the processing system during the extrusion die change. The diversion bore 94B can be formed in piston head 94 so that the diversion bore 94B directs flowable material received by the portion of the material flow bore 92A distal from the extrusion die exchanger 100 out of the diverter 90 and away from the process flow path and the extrusion die and die exchanger.

Figure 7A:
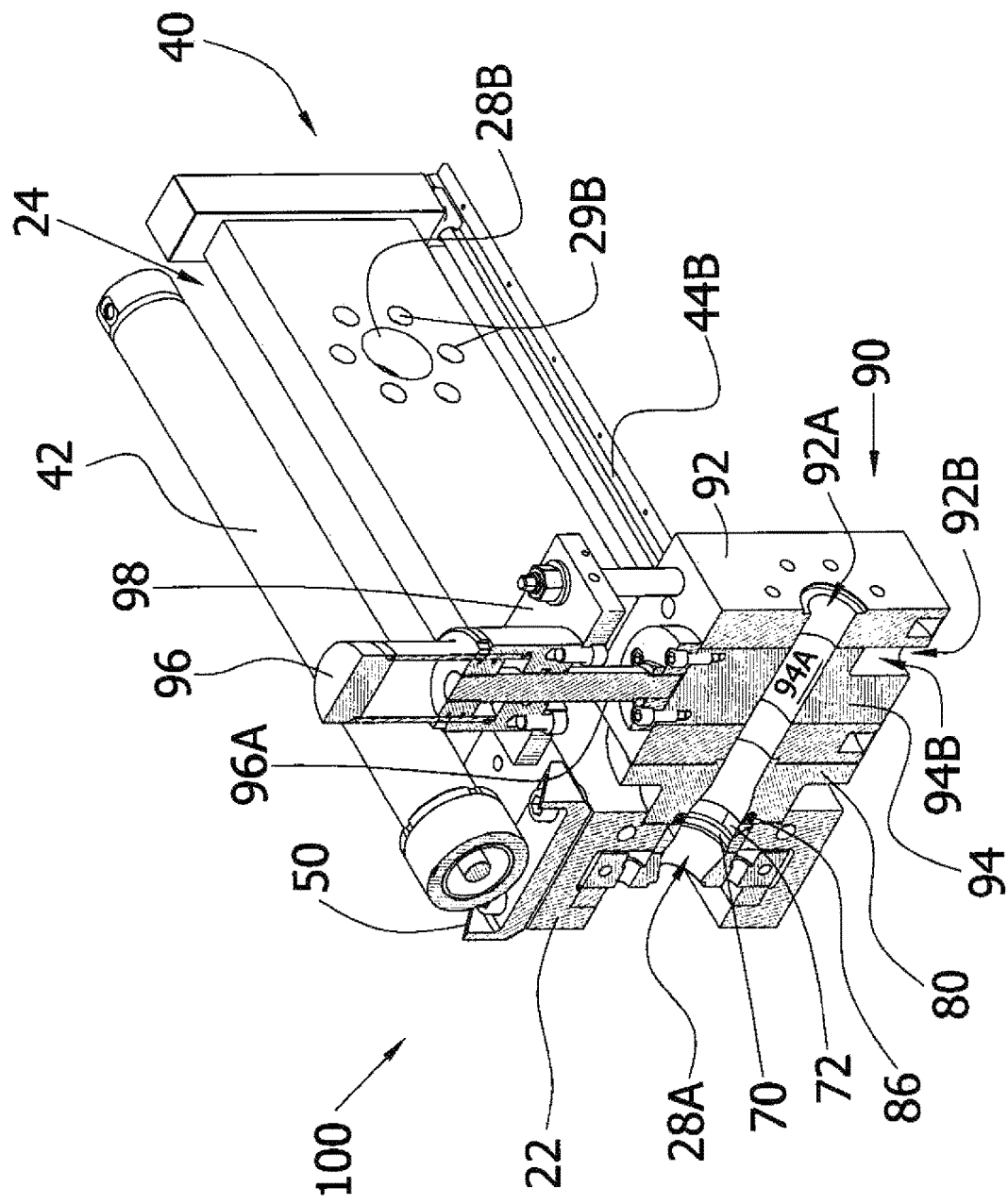
FIG. 7A illustrates a partial cross-sectional perspective view of the embodiment of the extrusion die system according to FIG. 6A, with the diverter in a material flow through position.
Figure 7B:
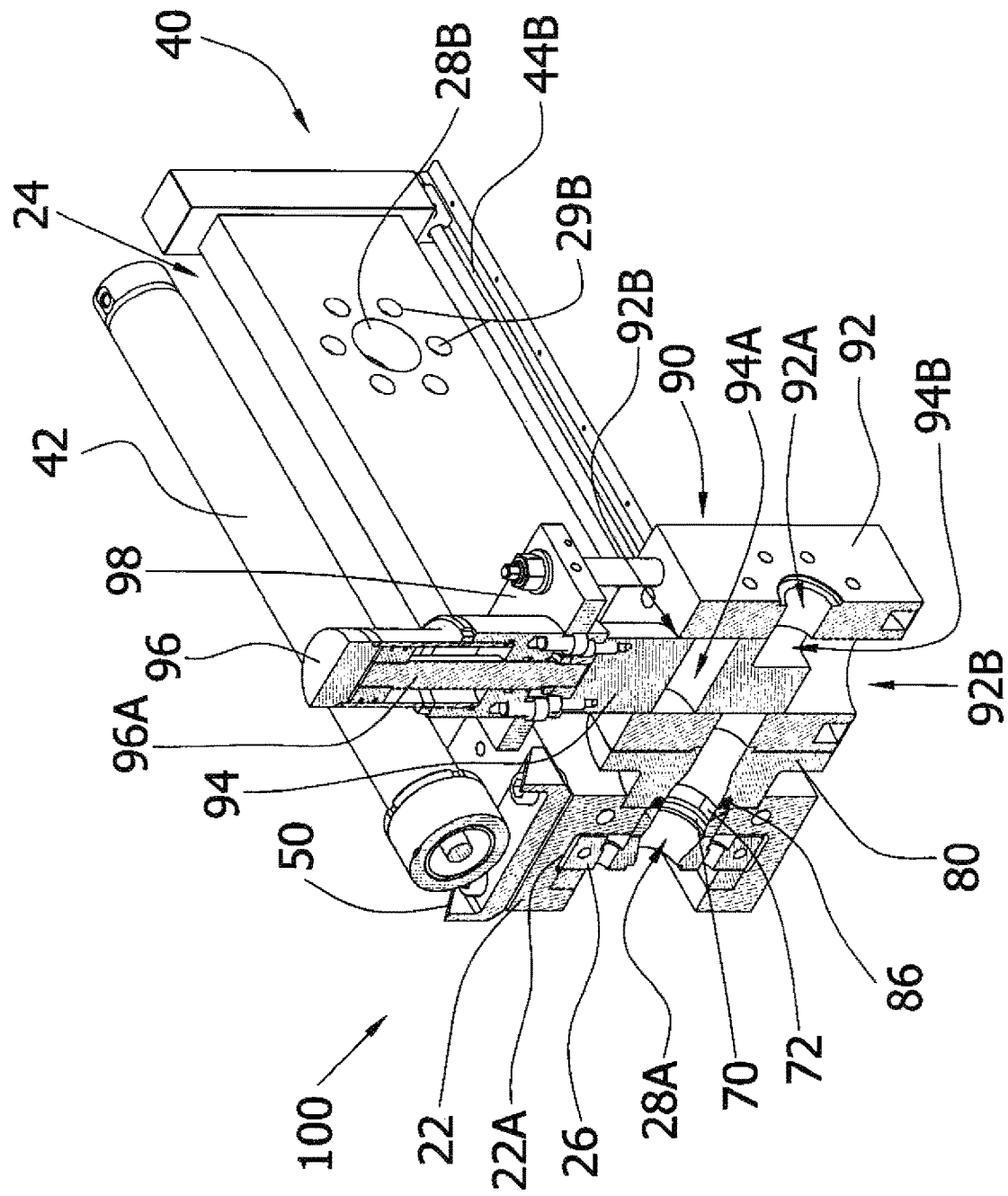
FIG. 7B illustrates a partial cross-sectional perspective view of the embodiment of the extrusion die system according to FIG. 6A, with the diverter in a diversion through position.

More particularly, the diversion bore 94B can be formed to divert the flow of material downward and out the bottom portion of the piston aperture 92B. For example, the diversion bore 94B can have an end wall that extends downward through the bottom of the piston head 94 about perpendicular to the entry portion of the material flow bore 92A. As shown in FIGS. 7B and 8B, when the piston 94 is moved to an appropriate position, the diversion bore 94B is in a position to intercept the material and direct of the processing system through the bottom of piston aperture 92B so that the processing system can continue to operate during the changing of one extrusion die to another. The diverted material can be collected and recycled. To accomplish the movement of the piston head 94 from a diversion position to a flow through position and vice versa, the drive member 96 can move the piston rod 96A between an extended position and an retracted position. For example, a hydraulic cylinder 96 can be used to move the piston rod 96A between an extended position so that the piston head 94 is in a flow through position such that the material flow through bore 94A is aligned with the material flow bore 92A in the diverter housing 92 as shown in FIGS. 7A and 8A and a retracted position so that the piston head 94 is in a diversion position such that the diversion bore 94B is aligned with the entry portion of the material flow bore 92A in the diverter housing 92 as shown in FIGS. 7B and 8B. Thus, when the piston head 94 is in a diversion position, the flowable material within the material processing system is prevented from putting pressure on the slide plate 24 and the material, which can include, but is not limited to one or more polymers, is allowed to continue to flow to prevent material burn that can occur when the flowable material is stopped within the heated components of the material processing system. In this manner, less material can be wasted and less time is needed compared to the amount of time it takes to either heat up the components to operational capacity or clear the processing system of burnt material. In some such embodiments, condenser devices, such as mated rollers, which can include, but are not limited to pinch rollers (not shown), for example, can be provided to collapse the foam to create a denser material with less volume. For example, one or more guides (not shown) can be provided that can guide the diverted melt flow to condenser devices (not shown) to bleed out gas from the foam and collapse it to create a denser material with less volume that can be more easily handled for waste disposal or recycling purposes as described in more detail below.

Thus, while the piston head 94 is in a diversion position as shown in FIGS. 7B and 8B with the diversion bore 94B aligned with entrance side portion of the material flow bore 92A of the diverter housing 92, the slide plate 24 of the die changer 20 can be moved within the channel 22A of the housing 22 to a first position where the first bore 28A in the first section 26A of the elongate body 26 of the slide plate 24 and the first die that can be mounted to the slide plate 24 through fastening apertures 29A are aligned with the main supply feed bore. Once the slide plate 24 and the first extrusion die is securely in place, the piston head 94 can be moved to the flow through position with the material flow through bore 94A of the piston head 94 aligned with the material flow bore 92A of the diverter housing 92 as shown in FIGS. 7A and 8A so that the flowable material is directed through the first bore 28A and the first die. Similarly, while the piston head 94 is in a diversion position as shown in FIGS. 7B and 8B with the diversion bore 94B aligned with entrance side portion of the material flow bore 92A of the diverter housing 92, the slide plate 24 of the die changer 20 can be moved within the channel 22A of the housing 22 to a second position where the second bore 28B in of the slide plate 24 and a second die that can be mounted to the slide plate 24 through fastening, apertures 29B are aligned with the main supply feed bore. Once the slide plate 24 and the second extrusion die is securely in place, the piston head 94 can be moved to the flow through position with the material flow through bore 94A of the piston head 94 aligned with the material flow bore 92A of the diverter housing 92 so that the flowable material is directed through the second bore 28B and the second die. In this manner, the slide plate can be moved back and forth between the first position and the second position while the material within the processing system still flows.

Figure 10A:
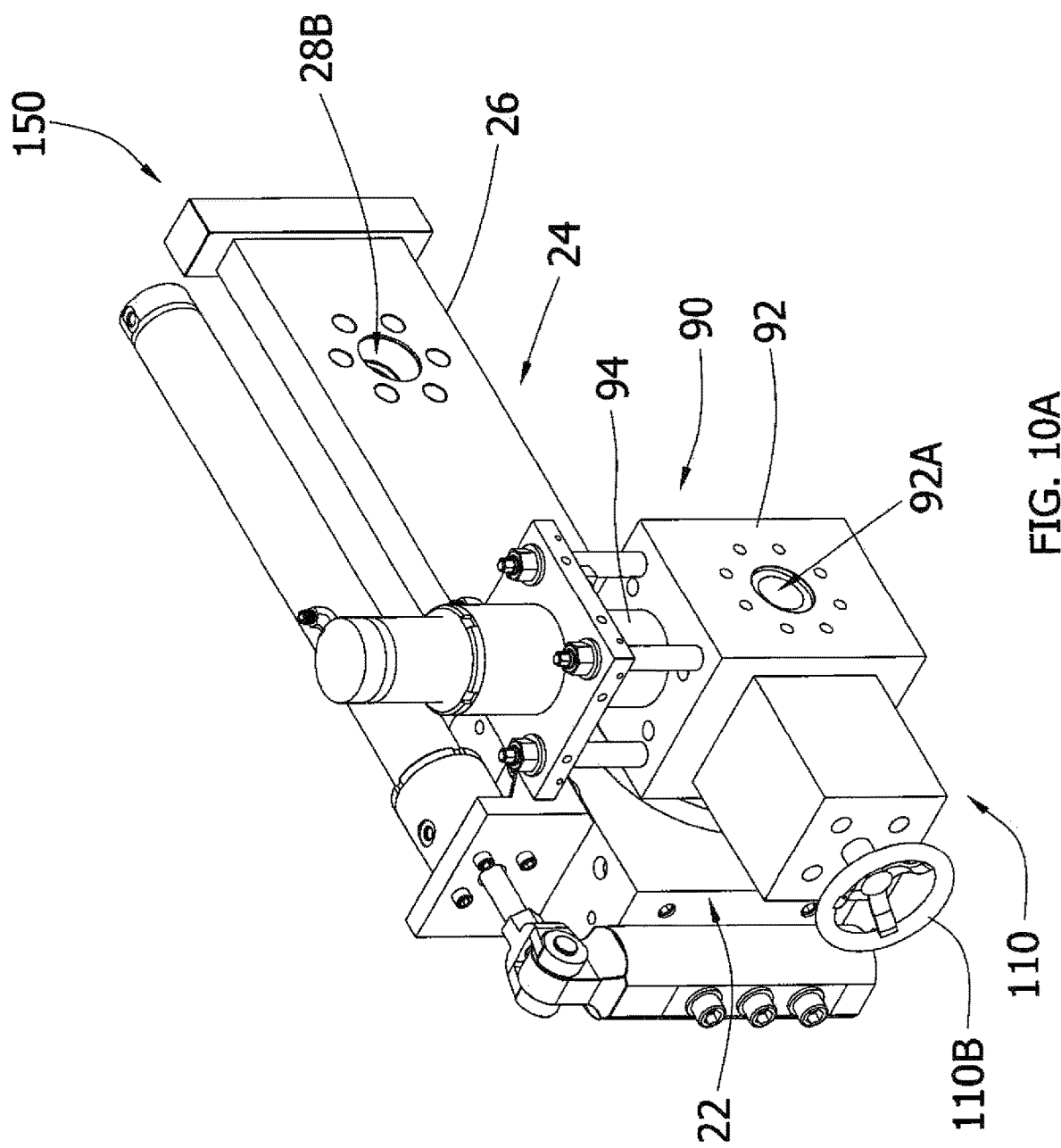
FIG. 10A illustrates a perspective view of an embodiment of a die changer that comprises a diverter with an embodiment of a restrictor thereon to control back pressure within a flowable material processing system according to the present subject matter.
Figure 10B:
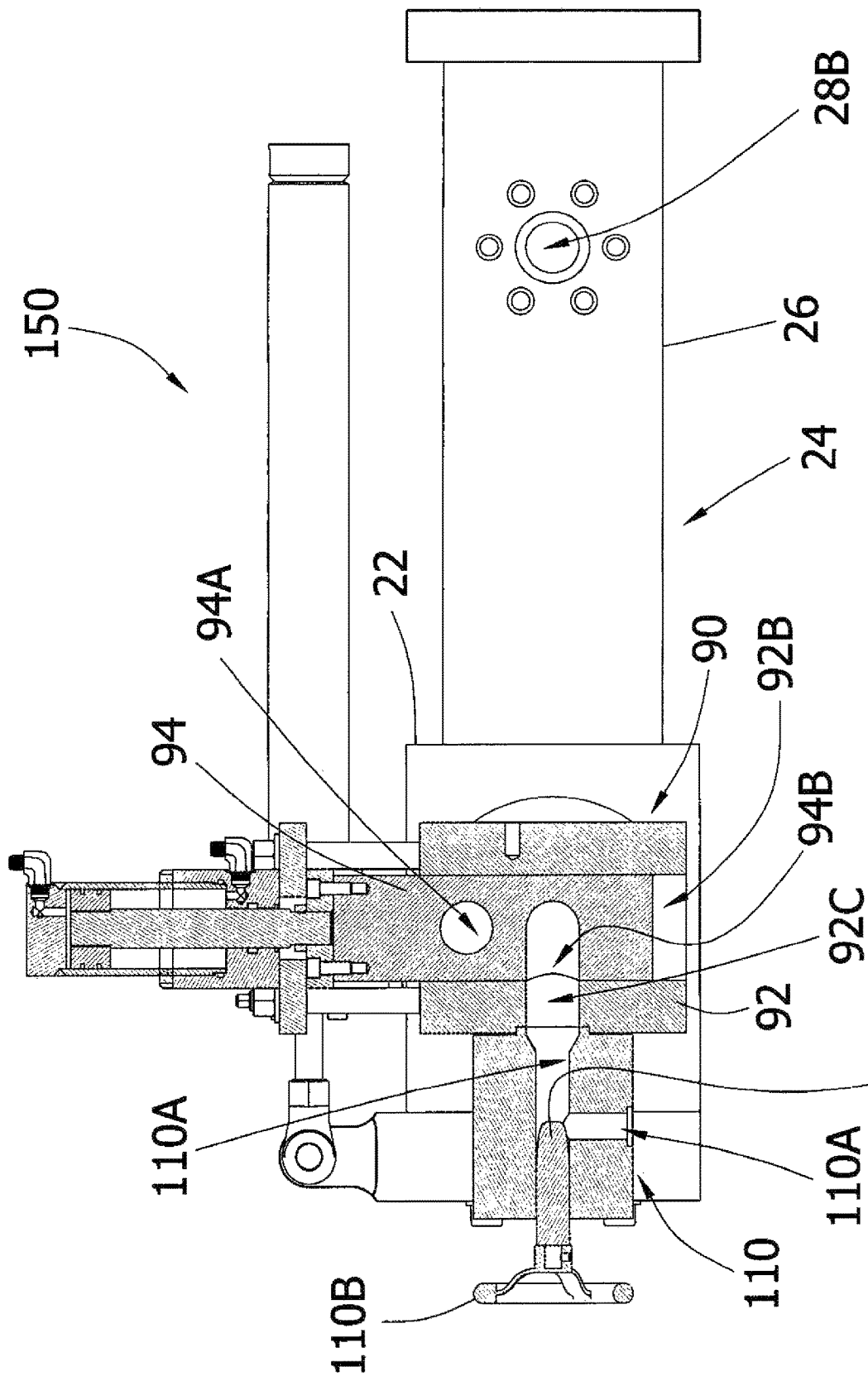
FIG. 10B illustrates a partial cross-sectional view of the diverter of the die changer according to FIG. 10A.

Referring to FIGS. 10A-10B, another embodiment of a die changer 150 is provided that comprises a diverter 90 thereon as described above for redirecting flow of the material being processed during a die change operation and further includes a restrictor 110 on a dump side of the diverter 90 to help maintain the consistent back pressure within a flowable material processing system, such as polymer processing system, while the die changing operation is performed. As in the embodiments described above, the die changer 150 can comprise a housing 22 having a main supply feed bore therethrough for directing a flow of material and a channel (not shown in FIGS. 10A-10C) that can be oriented transversely to the main supply feed bore. The die changer 150 can also comprise a slide plate 24 as described above that is movable through the channel and transverse to a direction of flow through the main supply feed bore. The slide plate 24 can comprise an elongate body 26 with a first bore (not shown in FIGS. 10A-10C) in a first section of the elongate body 26 and a second bore 28B in a second section of the elongate body 26 in a manner similar to the embodiments described above. As above, the diverter, or by-pass valve, 90 can be secured on the upstream side of the housing 22 of the die changer 150 upstream of the slide plate 24. The slide plate 24 can have extrusion dies secured on the downstream side of the slide plate 24 such that flowable material from the flowable material processing system passes through the diverter 90 before the flowable material reaches a respective bore of the slide plate 24 with which the upstream portion of processing line is aligned before entering the respective extrusion die. The diverter 90 can be used to allow the flowable material processing system to continuously run under operating conditions during an extrusion die change and prevent pressure from being exerted against the die changer and slide plate components.

The diverter 90 can comprise a housing 92 having a material flow bore 92A that extends through the diverter housing 92 and is alignable with a flow passage through the processing system through which the material being processed can flow and a diversion flow through bore 92C through which diverted material can flow. The material flow bore 92A is alignable with the material flow bore through the die changer housing 22 and one of the bores of the slide plate 24, when the slide plate 24 is moved into proper position to bring a respective extrusion die online in the flowable material processing system as described above. Additionally, the diverter housing 92 comprises a piston aperture 92B that transversely intersects the material flow bore 92A, as described above, for receiving a piston which comprises a piston head 94 that is configured to movably fit within the piston aperture 92B. The piston head 94 can comprise a material flow through bore 94A that extends through the piston head 94 such that when the piston head 94 is moved to a proper position, as described above, the material flow through bore 94A is aligned with the material flow bore 92A within the diverter housing 92 to allow material to flow from the flowable material processing system through the diverter 90 and die changer 150 to a respective extrusion die. As above, the piston head 94 can also comprise a diversion bore 94B that can be used to divert material that is received from the flowable material processing system through the diversion flow through bore 92C in the diverter housing 92 and out of the system to allow for a pressure-free extrusion die change while keeping the material flowing through the flowable processing system during the extrusion die change. The diversion bore 94B can direct flowable material received by the portion of the material flow bore 92A distal from the extrusion die exchanger 100 through the diversion flow through bore 92C in the diverter housing 92 and out of the diverter 90 and away from the process flow path.

Figure 10C:
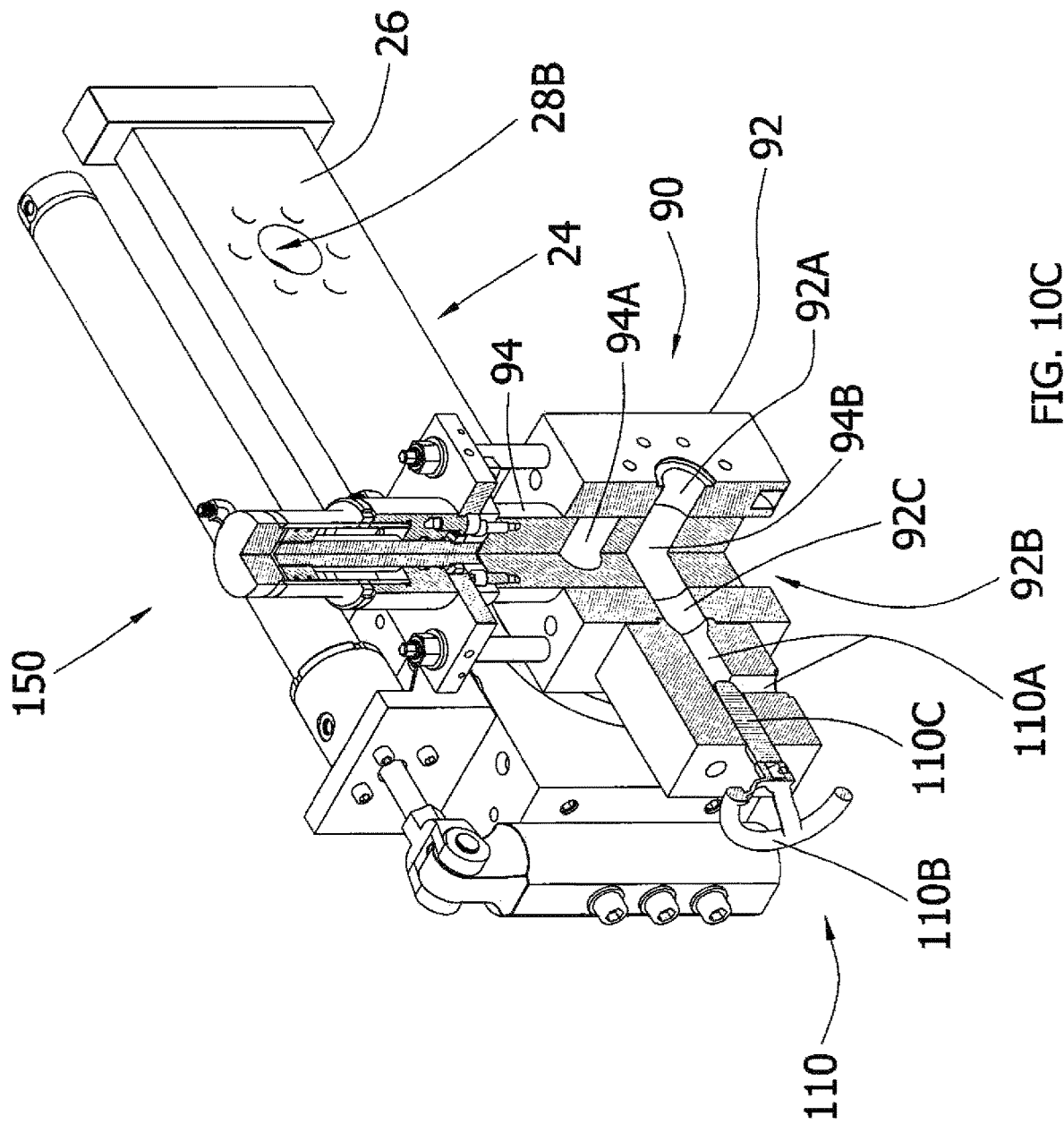
FIG. 10C illustrates a partial cross-sectional perspective view of the diverter of the die changer according to FIG. 10A.

The restrictor 110 can be beneficial in ensuring that the extrusion process does not see any change in backpressure. To help maintain back pressure within the flowable material processing system during a die change operation, the restrictor 110, such as a restrictor valve, or adjustment valve as shown, can be secured to the diverter housing 92 on a dump side 90C of the diverter 90. In the embodiment shown in FIGS. 10A-10C, for example, the restrictor 110 can have a restrictor flow through bore 110A that can be aligned with the diversion flow through bore 92C of the diverter housing 92. As shown in the current embodiment, the diversion flow through bore 92C can be angled, or as in other embodiments can be linear in nature. The restrictor 110 can include an actuator 110B and gate portion 110C can be used to adjust the amount of material flowing out of the diversion flow through bore 92C. For instance, as shown in the embodiment of FIGS. 10A-10C, the gate portion 110C of the restrictor 110 can be aligned with the diversion flow through bore 92C such that the gate portion 110C can be adjusted by the actuator 110B intersect with the diversion flow through bore 92C. The actuator 110B of restrictor 110 can be used to adjust the position of the gate portion 110B to decrease or increase the volume at the intersection of the gate portion 110B and the diversion flow through bore 92C through which the flowable material can flow. Thereby, the amount of flow through the diverter can increased and decreased and the amount of pressure in the processing system can be adjusted to maintain the back pressure therein.

The use of a restrictor 110 can be beneficial because the maintenance of the back pressure during a die change can be beneficial for several reasons. For example, by maintaining the same extruder back pressure, a consistent melt temperature can more easily be maintained. Additionally, by maintaining the same extruder back pressure, the melt temperature of the flowable material, such as a polymer, in the processing line can be better controlled. For example, by maintaining the same extruder back pressure, excess shear heat in the processing line and propagation of the flowable material can be prevented. Without maintaining the same extruder back pressure, such propagation can cause several potential output variations lasting up to 10 to 15 minutes or more due to the extruder residence time. Therefore, one or more restrictors 110 can be useful for maintaining the back pressure to prevent unnecessary flowable material wasted due to excess heat buildup and propagation of flowable material and unnecessary process line downtime.

A restrictor feature can be useful for foam lines as well where even a 3 to 5 minute down time can cause many minutes of readjustment (for example, up to 10 or 15 minutes) on the new die due to temperature changes in the secondary (or cooler) portion of the screw as the temperature often runs below the melting point of the polymer for foam processing and freeze off can occur very fast. Similarly, by maintaining the same extruder back pressure in foam polymer processing lines, the effect of the foaming agent on the polymer in the processing line can be better controlled. For example, by maintaining the same extruder back pressure, the propagation of the foaming agent and its foaming effect up the processing line into the extruder can be prevented. Without maintaining the same extruder back pressure, such propagation can cause variation in the foam density due to the extruder residence time until the correct back pressure is achieved that can result in a large amount of foamed polymer waste. Thus, one or more restrictors can be useful for maintaining the back pressure to prevent unnecessary polymer waste and unnecessary downtime in the foam polymer processing line as well. For example, in some embodiments, a variable pressure restrictor can be used on the discharge port that can be adjusted as needed to maintain constant die pressure of the extruder during the die change, as well as constant melt temperature (as melt temperature and percent foaming agent are directly related).

Figure 11A:
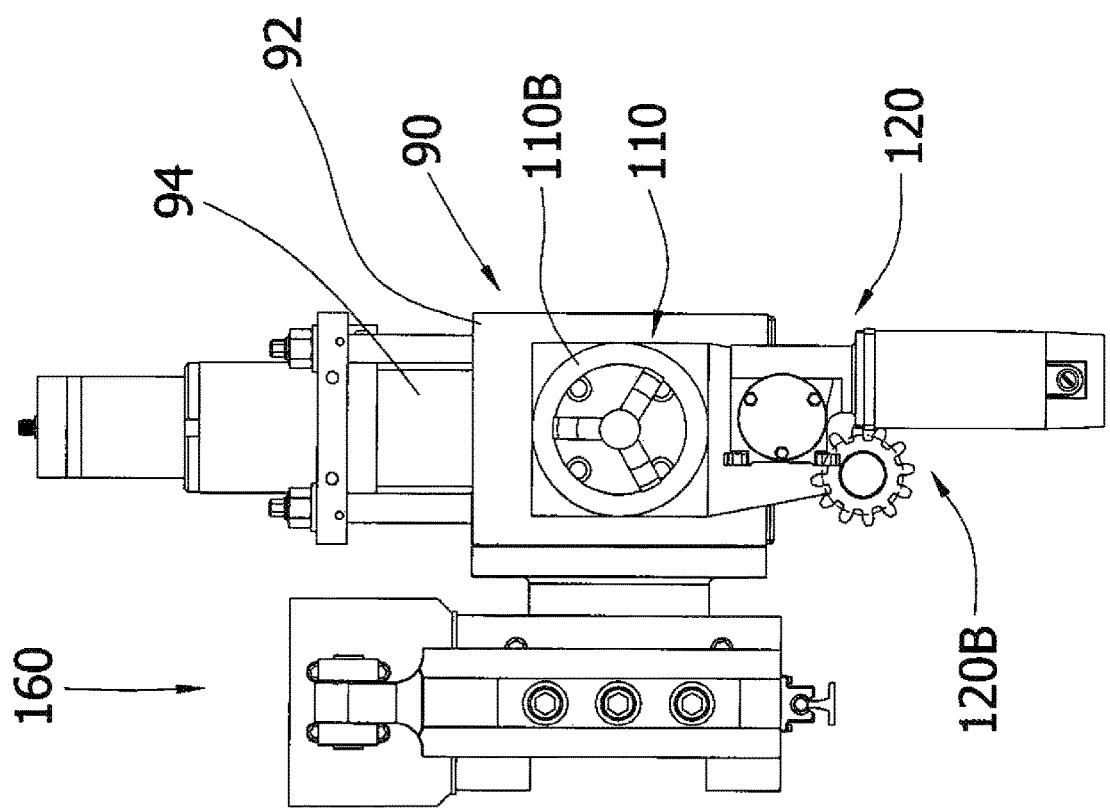
FIG. 11A illustrates a perspective view of an embodiment of a die changer that comprises a diverter with an embodiment of a restrictor and an embodiment of a condenser device thereon to control back pressure within a flowable material processing system according to the present subject matter.
Figure 11B:
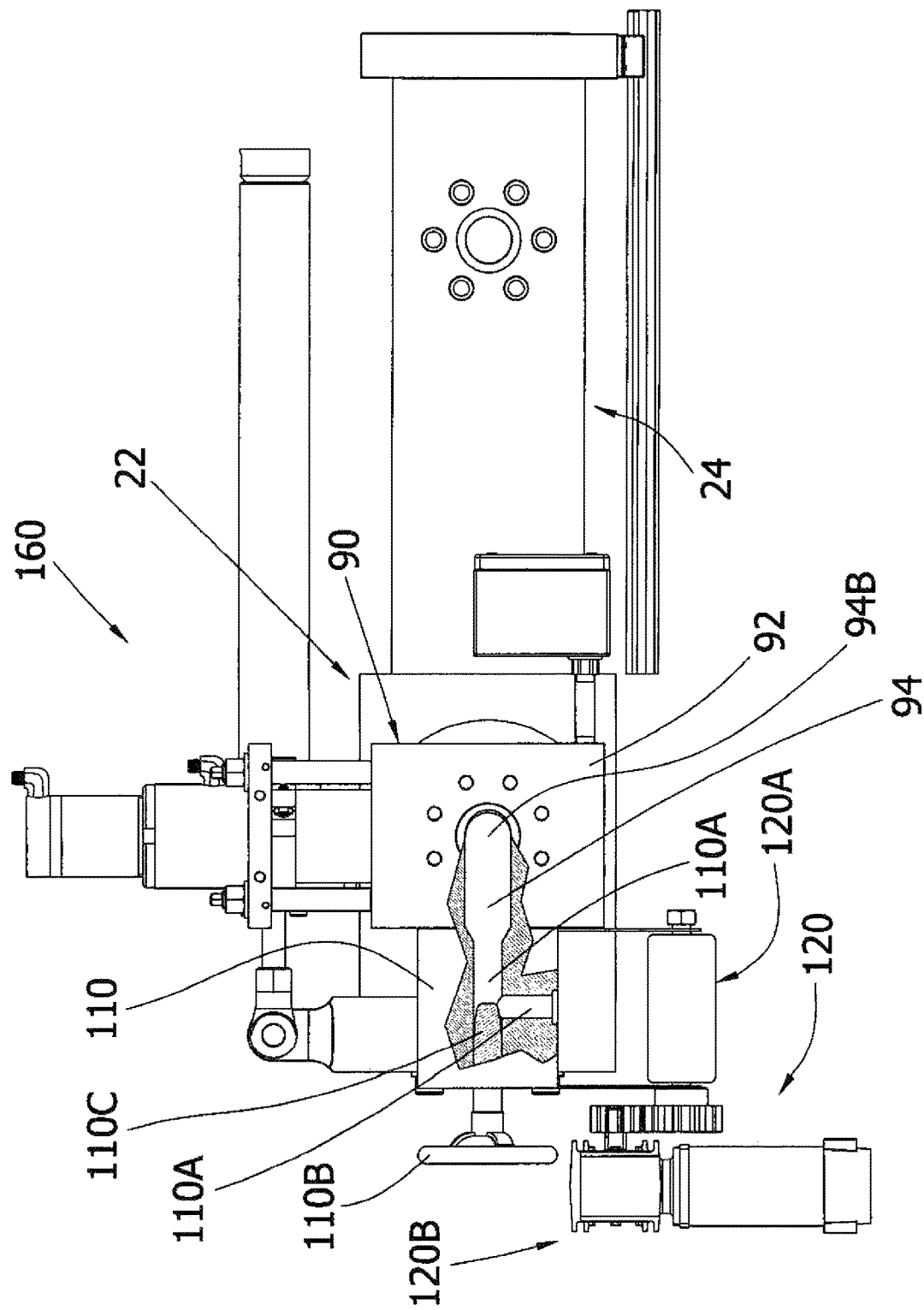
FIG. 11B illustrates a partial cross-sectional view of the diverter of the die changer according to FIG. 11A.

Referring to FIGS. 11A and 11B, to further help reduce the volume of material waste when a diverter 90 is diverting material out of the processing line during the changing of the die, one or more condenser devices 120 can be positioned at or near the exit point where diverted material exit the process line. As shown in FIGS. 11A and 11B, a die changer 160 can comprise a housing 22 having a main supply feed bore therethrough and a channel (not shown in FIGS. 11A and 11B) and a slide plate 24 that is movable through the channel as described above. The diverter 90 as shown in FIGS. 11A and 11B comprises a housing 92 and a piston which comprises a piston head 94, as described above. The piston head 94 can comprise a material flow through bore (not shown in FIGS. 11a and 11B) that extends through the piston head 94 and a diversion bore 94B that can be used to divert material that is received from the flowable material processing system through the diverter housing 92 and into a restrictor 110. The diverted flowable material can pass through a restrictor flow through bore 110A in the restrictor 110 to the condenser device 120 that can compress the flowable material as it exits the restrictor 110. In the embodiment shown, the condenser device comprises a set of rollers 120A between which the flowable material passes to compress and/or collapse the flowable material as it exits the restrictor in the embodiment shown and a driver 120B that can engage and rotate the rollers 120A as needed when the flowable material is diverted by the diverter 90 during a die change operation. The driver 120B of the condenser device 120 can be in operable communication a controller such as the controller 30 shown in FIG. 1 to coordinate the operation of the condenser device 120 with the operation of the diverter 90. While the condenser device 120 is shown attached the restrictor 110, such condenser devices, and similar devices, can also be used in conjunction with other diverters, such as the diverter shown in FIGS. 7A-8B, that don't have a restrictor secured thereon.

Such condenser devices can be useful in the proposing of different types of flowable material. For the production of foamed polymers, for example, the condenser devices can compress the foamed polymer while it is still warm to bleed out gas from the foam, thereby, collapsing the foam to create a denser polymer with less volume. For example, the volume of the foamed polymer can be 10 times, 20 times, even 40 times larger than the volume of the unformed polymer. Thus, if the foam is not collapsed, the foam polymer exiting the diversion bore can become a housekeeping problem due to its sheer volume. The condensed polymer exiting such condenser devices will permit the polymer to be more easily handled. For example, the condensed polymer can be reground and then recycled by taking the grindings and placing them in the extruder so that the polymer can be re-extruded.

Referring for FIG. 1 again, the controller 30, shown in FIG. 1 schematically as a box, can be used to control different components of the extrusion die systems disclosed herein. For example, a controller 30 can be used to control both the diverter 90 and the slide plate shifter, which can be in the form of the hydraulic cylinder 42 (shown in FIGS. 6A-8B) that can be mounted on the die exchanger via a mounting bracket 50 as described above. The controller 30 can move the slide plate 24 back and forth between the first position and the second position using the slide plate shifter 42 and can be used to move the piston head 94 through the drive member 96. As above, the hydraulic cylinder 42 can have an extendable and retractable arm 42A secured to the slide plate 24 to move the slide plate 24 between the first position and the second position. Further, in some embodiments, the slide plate shifter 40 comprises at least one rail 44A, 44B on which the slide plate 24 rides as the slide plate 24 is moved between the first position and the second position. For example, the die changer 20 can comprise a first rail 44A position close to one side of the housing 22 and a second rail 44B positioned in proximity to an opposing side of the housing 22. The first and second rails 44A, 44B can be in parallel alignment within the same plane. For instance, in some embodiments, the first and second rails 44A, 44B can extend along a same axis line. In some embodiments, a single rail may be present as a portion of a slide plate shifter.

As above, the first end cap 46A on the slide plate 24 and a second end cap 46B on an opposite end of the slide plate 24. The first end cap 46A and the second end cap 46B can have linear bearings 48 attached thereto that can engage the first and second rails 44A, 44B. Further, the first end cap 46A can have a top portion 47A that can be engaged by the arm 42A of the hydraulic cylinder 42. For example, the arm 42A can comprise a clevis 49 on an end distal from the body of the hydraulic cylinder 42 that can engage the top portion 47A of the first end cap 46A as described above.

A controller 30 can also be used to adjust an actuator 110B and gate portion 110C of a restrictor 110 as shown in FIGS. 10A-11B to help control the back pressure with the flowable material processing system. Similarly, a controller 30 can also be used to operate the condenser device 120 as shown in FIG. 11A-11C as described above.

By using the die changer system described above, a "clean process" can be created where there is easy access for cleaning the offline die and die changer flow channels before introducing the offline die and its respective die changer flow channels back on line. The segmented seal technology helps with this by providing "leak free" operation. In particular, the springs 86 can push against the ring segments 72 to create enough pressure between the segmented connector ring 70 and the slide plate 24 to prevent leakage of the material during the shift of the slide plate 24. When the extrusion die is off-line, the die can be removed if needed and thoroughly cleaned. The heating of the extrusion dies can facilitate easier cleaning of the dies. For example, hot oil can be run through the extrusion dies in a manner similar to the manner in which hot oil is run through the slide plate 24. The heated oil can be run through conduits in the dies to heat the surrounding portions of the dies. The heated oil can, for example, be run from slide plate 24 to the extrusion dies. Alternatively, the heated oil can be run from a separate supply for each die. The heating of the extrusion dies can reduce the time of cleaning of the extrusion die by keeping the material therein heated. The heat source can be turned off once the extrusion die is cleaned. For example, the flow of heated oil can be turned off. Once cleaned, the extrusion die can be reused. For example, the extrusion die can be secured back in place on the die exchanger or it can be replaced by another extrusion die on the die exchanger depending on the extrusion needs for the processing line.

Figure 9A:
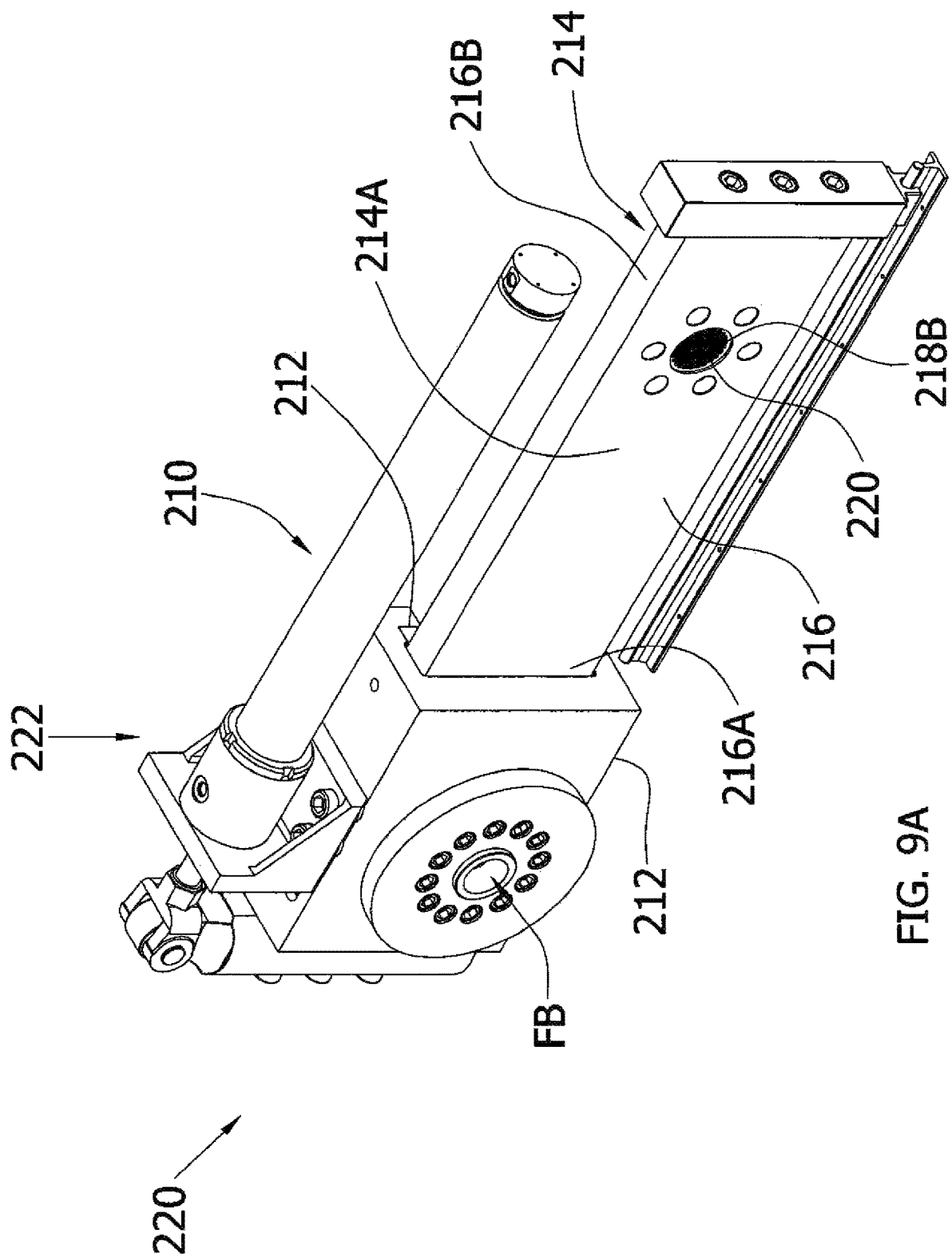
FIG. 9A illustrates a perspective view of a portion of another embodiment of a slide plate of a die changer according to the present subject matter.
Figure 9B:
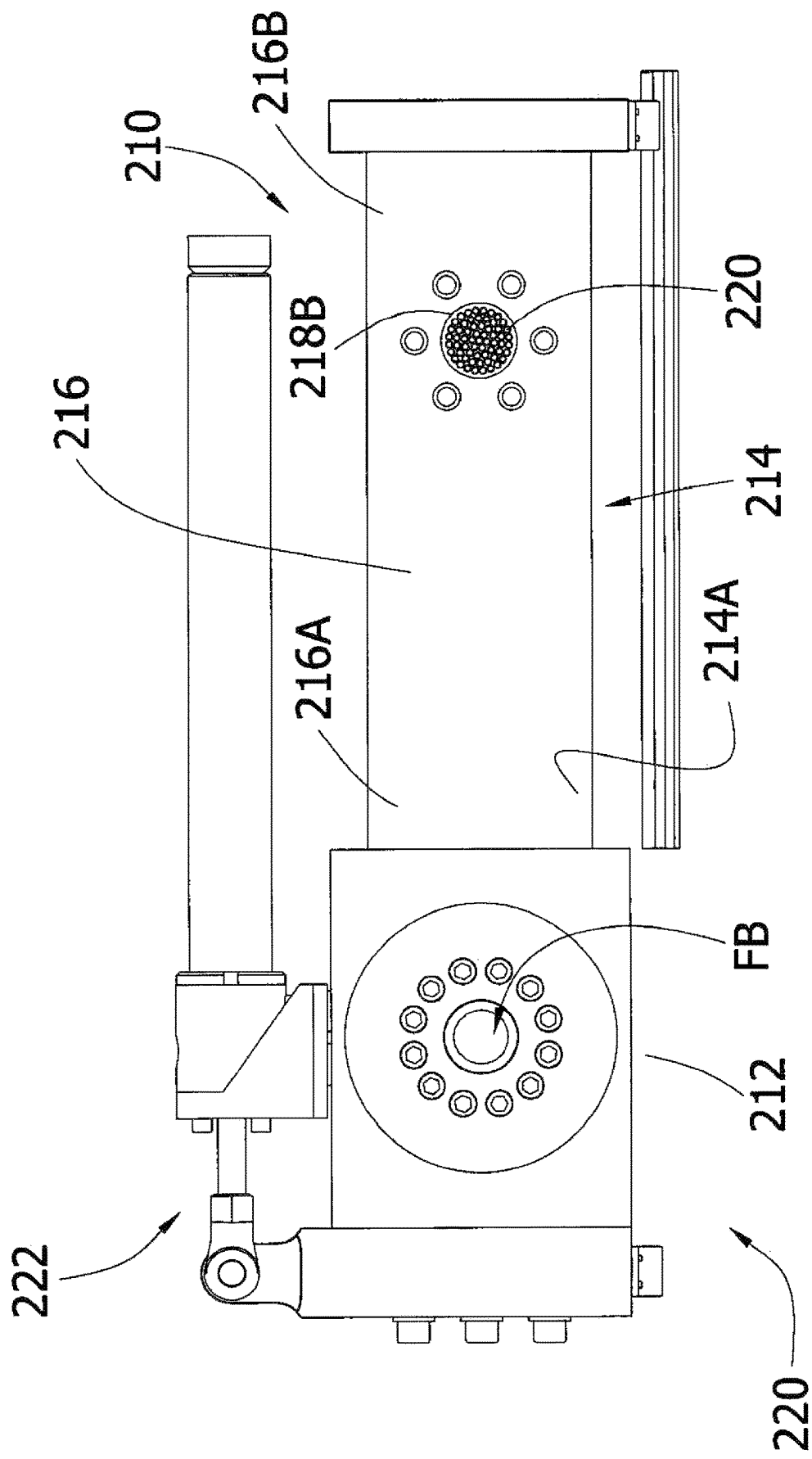
FIG. 9B illustrates a front plan view of the portion of the embodiment of the extrusion die system according to FIG. 9A.

The cleanliness of the material can also be improved in some embodiments of the die exchanger, a portion of another embodiment of a die exchanger system, generally designated 200, is shown in FIGS. 9A and 9B. The extrusion die system 200 can comprise a first die and a second die (not shown) that can be secured to an embodiment of a die changer, generally designated 210. As soon in FIGS. 9A and 9B, the die changer 210 can comprise a housing 212 having a main supply feed bore FB therethrough for directing a flowable material, which can include, but is not limited to a flowable material, (the direction of which is shown by arrow A) and a channel 212A that can be oriented transversely to the main supply feed bore FB. The die changer 210 can also comprise a slide plate 214 movable through the channel 212A and transverse to a direction of flow through the main supply feed bore FB. The slide plate 214 as shown in FIGS. 9A and 9B can comprise an upstream slide plate surface 214A that faces the main supply feed bore FB and a downstream slide plate surface that faces the first and second dies. As with previous embodiments, the slide plate 214 can also comprise an elongate body 216 that can comprise a first section 216A with a first bore (not shown) extending through the first section 216A of the elongate body 216 and a second section 216B with a second bore 218B extending through the second section 216B of the elongate body 216. As seen in the FIGS. 9A and 9B, the slide plate 214 has been slid into a position where feed bore FB of the housing 212 is positioned to be aligned with the first bore in the first section 216A of the elongated body 216. The die changer 210, including the slide plate 214, operate in a similar manner to the embodiments described above, with a slide plate shifter 222 that can be used to move the slide plate 214 and the associated extrusion dies attached to the respective first and second section 216A, 216B of the elongate body in and out of alignment with housing 212 so that the respective first and second bores can be aligned with the feed bore FB of the housing.

To facilitate the cleaning of the material before it is extruded, a filtration device is placed in-line between the extruder and the downstream module to filter the material extrudate and thereby improve its quality and uniformity. For example, a filtration device 220 can be secured in each of the first bore and second bores 218B. As shown in FIG. 9A and 9B, the filtration device, in the form a screen, is secured in the second bore 218B. The filtration device 220 can operate in a similar manner to the filtration devices described in U.S. Pat. No. 7,147,774, incorporated by reference herein in its entirety, for all purposes. When the first bore is positioned in-line with the feed bore FB as shown in FIGS. 9a and 9B, the filtration device therein is in-line with the flow of material while the other filtration device 220 is offline and thus accessible for cleaning or replacement.

In the retracted position, specifically shown in FIGS. 9A and 9B, the first bore with its filtration device is positioned in-line—that is, in alignment with flow bore FB and thus operates in the flow path to filter the material melt flowing therethrough. While in the retracted position, the second bore 218B and the filtration device 220 therein are positioned offline—that is, beyond flow bore FB for cleaning and/or replacement. Although not specifically shown, it will be understood that while slide plate 214 is in the extended position, the second bore 218B and its filtration device can be positioned in-line so that the second bore 218B and its filtration device 220 are in alignment with the flow bore FB to filter the material melt flowing therethrough and the first bore and its filtration device can be positioned offline so that the first bore and its filtration device are positioned outside of the processing line for cleaning and/or replacement of the filtration device as needed in addition to the associated extrusion die being available for cleaning and/or replacement. As appreciated by persons skilled in the art, the extrusion die changer 210 is designed to enable the switching of first and second extrusion dies during operation of the associated polymer processing system, i.e., without having to suspend the flow of material melt and with a minimized pressure drop within processing system.

In such embodiments of a die changer 210, which can be used in systems with or without a diverter, the filtration of the material can occur right before extrusion to decrease the likelihood that any foreign matter or off-quality degraded material are extruded into the extruded product. Alternatively, the die changer 210 with the filtration devices therein can be in addition to filtration mechanisms situated or positioned earlier in the polymer processing system to add additional filtration for the extruded material to decrease the likelihood of defective products. Thus, the die exchanger 210 with filtration devices positioned in the respective bores through which material flows could eliminate an additional screen changer from being used upstream, or alternatively, could act as a secondary filter for final filtration right at the die. More particularly, for example, for recycled processes, it is often found that primary and secondary filters are required for coarse and fine filtration given the contamination level. In this case, the die changer 210 could act as the secondary filter. Another example of when such filtration devices at the extrusion dies may be useful is when the primary filter introduces an unacceptable amount of charred or degraded material into the melt stream during a screen change or shift.

Thus, in some instances, the method includes flowing molten material, which can include but is not limited to one or more polymers, that forms the flow of material through the main supply feed bore, the first bore, and the first die when the slide plate is in the first position. To change the die and move the slide plate to the second position, the flow of molten material can be stopped before moving the slide plate from the first position to the second position. In some instances, the method includes flowing molten material that forms the flow of material through the main supply feed bore, the second bore, and the second die once the slide plate is in the second position. Similarly, to change the die and move the slide plate to the fist position, the flow of molten material can be stopped before moving the slide plate from the second position to the first position.

Depending on the components and configuration of the die changer, the step of moving the slide plate within the channel of the housing can comprise moving the slide plate between the first position and the second position with a hydraulic cylinder having an extendable and retractable arm secured to the slide plate as described above. Similarly, the step of the moving the slide plate within the channel of the housing can also comprise sliding the slide plate along at least one rail to move the slide plate between the first position and the second position. In particular, in some embodiments, the die changer can comprise a first end cap on a first end of the slide plate and a second end cap on a second end of the slide plate with the first end cap and the second end cap having linear bearings attached thereto that engage the at least one rail with the first end cap being engaged by an arm of a hydraulic cylinder. In such embodiments, the step of moving the slide plate within the channel of the housing can comprise moving the arm of the hydraulic cylinder to move the slide plate with the linear bearings providing guidance and support along the at least one rail.

Thus, as described herein, extrusion die systems and die changers are provided to change dies in and out of an extrusion line with hydraulically actuated moving parts, supported by linear bearings and rails. Installation of the die changers can be just before the die in the extrusion line. The extrusion line dies can be connected to the die changer must be supported with the ability to maneuver in and out of the extrusion line. When the process requires it, a trained operator can shut down the extrusion line to stop molten plastic flow before actuating the die changer. The in line die can be disconnected from the extrusion line and transferred out of line by activating the slide plate shifter. In particular, in some embodiments, the transfer occurs by activating a hydraulic cylinder of the slide plate shifter. In less than one minute, a clean new die can be introduced into the extrusion line as the previous die is removed from the extrusion line. This operation can be performed while the extrusion line is shut down. Shutting down the extrusion line can prevent dead heading of the melt flow, which can cause extreme equipment damage and severe personal injuries.

The linear bearings and rails can be designed to support the die changer as a stand-alone unit. The extrusion dies connected to the die changer can be supported with the ability to maneuver in and out of the extrusion line with a support as shown in FIG. 4 and described above. The die changer may or may not be fitted with special guards to provide a safety guard system to interlock with the hydraulic power unit to prevent injury to the operator.

The die changer can be configured to run on one temperature control zone or multiple temperature control zones. For example, die changer can be configured to run on three temperature control zones. For example, single zone die changers can be designed to be used with materials that aren't temperature sensitive. The desired temperature is typically set close to the rest of the heat zones in the process. When the temperature controller calls for heat on the unit, all of the heaters fire; these include the body heaters and the slide plate heaters.

Three zone die changers can be designed to be used with materials that are temperature sensitive. The desired temperature may be set differently from the rest of the heat zones in the process. The three heat zones can comprise body heaters, slide plate clevis end heaters, and slide plate free end heaters. The body heaters zone can typically be set close to the rest of the heat zones in the process. The slide plate clevis end heaters and the slide plate free end heaters can be set to the exact same temperature but the temperature controllers does not have to call for heat at the same time. This is due to the transfer of heat from the melt into the part of the slide plate in the flow position. To find the optimum set point temperature for the two slide plate zones a set of instructions can be followed. First, both slide plate temperature zones can be set to the lowest value of the material's melt temperature range. The operator or controller can then wait for all three heat zones to come up to temperature before starting the process. At the time of the first die change, the operator can clean the pocket thoroughly. Any safety guards can be put back in place. Once the material flow has been flowing for a set time, such as 5 to 10 minutes, the operator can open the guard door and inspect the flow cavity periodically. If the material is frozen off, the slide plate temperature can be increased by 10 to 50 degrees F. (6 to 28 degrees C.) at each time it is needed. Alternatively, if the material is degrading or burning, the slide plate temperature can be decreased by 10 to 50 degrees F. (6 to 28 degrees C.) at each time it is needed. Finer adjustments can be made after the temperature is close to the desired setting. The above procedure can be repeated until the material that is in the flow cavity, not in the melt stream, remains melted but does not degrade or burn. Measuring the temperature of the slide plate around and in the flow cavity with a temperature gun or thermocouple can be helpful in determining the optimum set point. In particular, the areas at the top and bottom quadrant of each pocket tend to run a few degrees hotter than the center of the plate.

Thus, using the extrusion die systems, die changers and related methods described above, dies within an extrusion line can be easily and quickly accomplished. The frequency of die changes will depend upon the end product requirements. For example, in blown film extrusion, it will be required to change out dies depending on the bubble diameter required for the end product.

Figure 12:
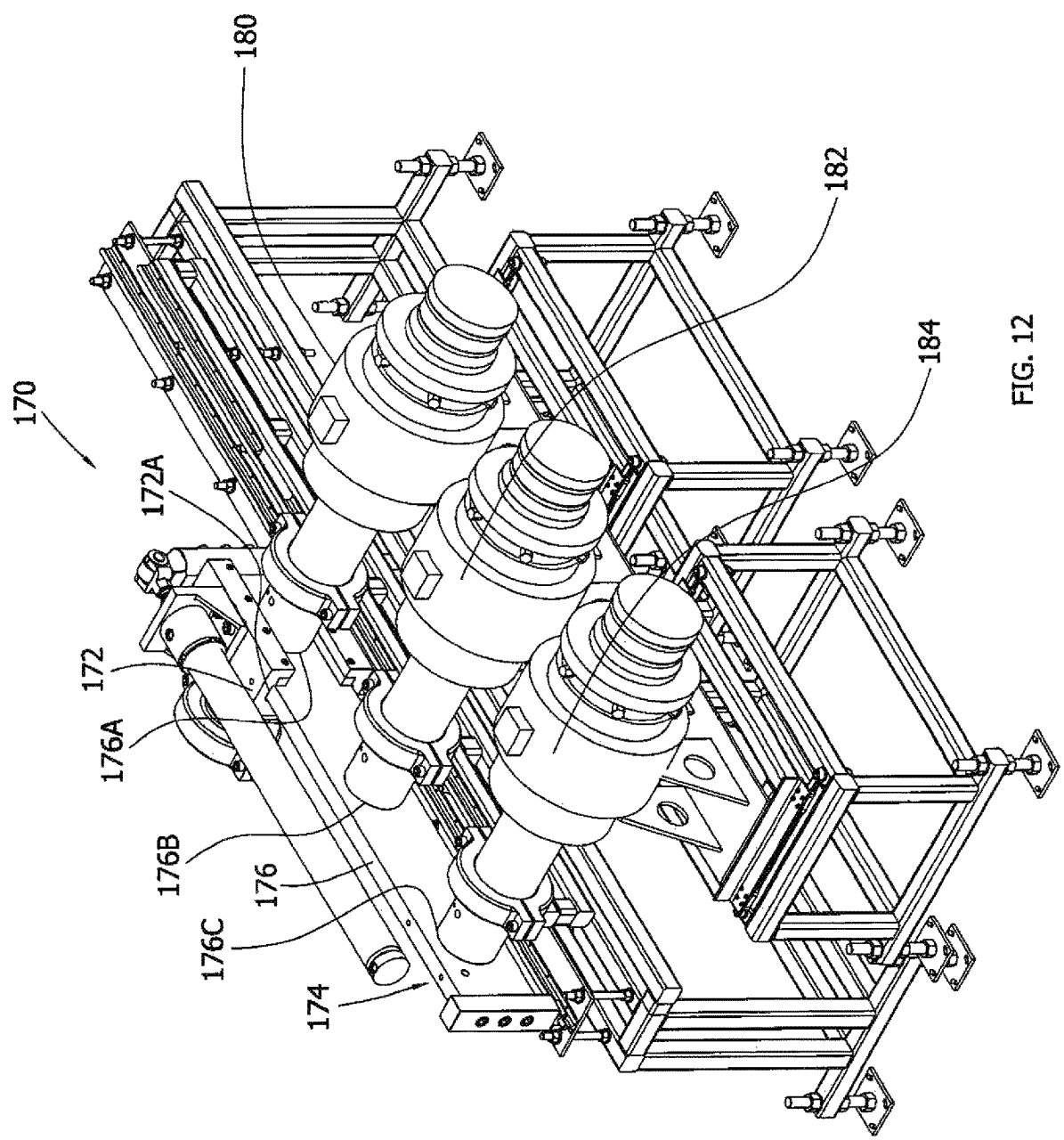
FIG. 12 illustrates a perspective view of a further embodiment of an extrusion die system that uses an embodiment of a die changer according to the present subject matter.

While the die changers described above describe the changing between a first die and second die secured to a slide plate of a die changer for illustrative purposes, it is noted that a die changer can be built that can accommodate a plurality of dies greater than two. As shown in FIG. 12, an embodiment of a die changer 170 is provide that can accommodate three (3) dies 180, 182, and 184. The die changer 170 can comprise a housing 172 having a main supply feed bore therethrough for directing a flowable material (the direction of which is shown by arrow A), such as for example, a flow of polymer, and a channel 172A that can be oriented transversely to the main supply feed bore (not shown). The die changer 170 can also comprise a slide plate 174 movable through the channel 172A and transverse to a direction of flow through the main supply feed bore. Similarly to the embodiments described above, the slide plate 174 can comprise an upstream slide plate surface that faces the main supply feed bore and a downstream slide plate surface 174B that faces the first second, and third dies 180, 182, 184. The slide plate 174 can also comprise an elongate body 176 that can comprise a first section 176A with a first bore (not shown) extending through the first section 176A of the elongate body 176, a second section 176B with a second bore (not shown) extending through the second section 176B of the elongate body 176 and a third section 176C with a third bore (not shown) extending through the third section 176C of the elongate body 176. In FIG. 12, the first bore in the first section 176A is aligned with the feed bore of the processing line so that the extruder die 180 is being used to process the flowable material within the system. The die changer 170, while having more dies secured thereto, can operate in a manner similar to the embodiments, described above. Therefore, the operation of the die changer 170 will not be further described herein.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole or in part. Furthermore, those of ordinary skill in the art will appreciate that the foregoing description is by way of example only, and is not intended to limit the present subject matter.

What is claimed is:

1. A method for changing of dies in and out of an extrusion line, the method comprising:
providing a die changer within an extrusion line, the die changer comprising:
a die changer housing having a main supply feed bore therethrough for directing a flowable material and a channel oriented transversely to the main supply feed bore; and
a slide plate movable through the channel and transverse to a direction of flow through the bore, the slide plate comprising an upstream slide plate surface, a downstream slide plate surface, and an elongate body having a first section and a second section, a first bore extending through the first section of the elongate body of the slide plate with a first die secured to the first section and operably aligned with the first bore and a second bore extending through the second section of the elongate body of the slide plate with a second die secured to the second section and operably aligned with the second bore; and
moving the slide plate within the channel of the die changer housing between a first position where the first bore in the first section of the elongate body of the slide plate is aligned with the main supply feed bore so that the flowable material is directed through the first bore to the first die and a second position where the second bore in the second section of the elongate body of the slide plate is aligned with the main supply feed bore so that the flowable material is directed through the second bore to the second die.

2. The method according to claim 1, further comprising flowing molten material that forms the flowable material through the main supply feed bore, the first bore, and the first die once the slide plate is in the first position.

3. The method according to claim 1, further comprising flowing molten material that forms the flowable material through the main supply feed bore, the second bore, and the second die once the slide plate is in the second position.

4. The method according to claim 1, wherein the die changer further comprises a diverter secured on the upstream side of the die changer housing upstream of the slide plate for diverting flowable material to allow continuous flow of material during a die change operation and the method further comprising diverting flowable material with the diverter upstream of the slide plate for diverting flowable material to allow continuous flow of material during a die change operation.

5. An extrusion die system for use in flowable material processing systems, comprising:
a die changer comprising:
a die changer housing having a main supply feed bore therethrough for directing a flowable material and a channel oriented transversely to the main supply feed bore; and
a slide plate movable through the channel and transverse to a direction of flow through the bore, the slide plate comprising an upstream slide plate surface, a downstream slide plate surface, and an elongate body having a first section and a second section, a first bore extending through the first section of the elongate body of the slide plate and a second bore extending through the second section of the elongate body of the slide plate;
a first die securable to the slide plate at the downstream slide plate surface to be aligned with the first bore in the first section of the elongate body of the slide plate;
a second die securable to the slide plate at the downstream slide plate surface to be aligned with the second bore in the second section of the elongate body of the slide plate; and
the slide plate of the die changer being movable within the channel of the die changer housing between a first position where the first bore in the first section of the elongate body of the slide plate and the first die are aligned with the main supply feed bore so that the flowable material is directed through the first bore and the first die and a second position where the second bore in the second section of the elongate body of the slide plate and the second die are aligned with the main supply feed bore so that the flowable material is directed through the second bore and the second die.

6. The system according to claim 5, wherein the die changer further comprises a slide plate shifter that moves the slide plate between the first position and the second position and a controller in communication with the slide plate shifter.

7. The system according to claim 6, wherein the slide plate shifter comprises a hydraulic cylinder having an extendable and retractable arm secured to the slide plate to move the slide plate between the first position and the second position.

8. The system according to claim 6, wherein the slide plate shifter comprises at least one rail on which the slide plate rides as the slide plate is moved between the first position and the second position.

9. The system according to claim 8, wherein the die changer further comprises a first end cap on a first end of the slide plate and a second end cap on a second end of the slide plate, the first end cap and the second end cap having linear bearings attached thereto that engage the at least one rail of the slide plate shifter with the first end cap being engaged by an arm of a hydraulic cylinder of the slide plate shifter.

10. The system according to claim 8, wherein the die changer further comprises an extrusion die support comprising a support base and a rail on which the first and second extrusion dies ride to support the first and second extrusion dies as the slide plate moves between the first and second positions.

11. The system according to claim 5, further comprising an upstream seal ring annularly disposed about a central bore axis of the main supply feed bore and comprising first and second opposing upstream seal surfaces, the first upstream seal surface facing downstream for sealably contacting the upstream slide plate surface and the second upstream seal surface angled with respect to the bore axis.

12. The system according to claim 11, further comprising a plurality of separate and individual ring segments arranged in frictional engagement with each other to form a segmented ring annularly disposed about the bore axis of the main supply feed bore, each ring segment comprising a tapered ring surface generally complementarily angled relative to and sealably contacting the second upstream seal surface of the upstream seal ring.

13. The system according to claim 12, further comprising an annular connector ring clamp contacting the plurality of ring segments, wherein the ring segments are axially interposed between the upstream seal ring and the connector ring clamp.

14. The system according to claim 5, wherein the slide plate comprises a first continuous flow channel surrounding the first bore in the first section of the elongate body of the slide plate and a second continuous flow channel surrounding the second bore in the second section of the elongate body of the slide plate that permit a heated fluid to circulate through the first and second continuous flow channels to heat the walls of the respective first and second bores.

15. The system according to claim 5, further comprising a diverter secured on the upstream side of the die changer housing upstream of the slide plate for diverting flowable material to allow continuous flow of material during a die change operation, the diverter comprising:
    a housing including a diverter housing feed bore alignable with the main supply feed bore of the die changer and a piston aperture that intersect with and is transverse to the diverter housing feed bore;
    a movable piston comprising a piston head configured to slidably fit within the piston aperture, the piston head including a material flow through bore that extends through the piston head and a diversion bore, the piston head being movable to a flow through position such that the material flow through bore is alignable with the diverter housing feed bore and the piston head being movable to a diversion position such that the diversion bore is alignable with a portion of the diverter housing feed bore that receives flowable material from upstream in the flowable material processing system to divert the flowable material from upstream in the flowable material processing system out of the flowable material processing system before the flowable material reaches the slide plate of the die changer.

16. The system according to claim 15, further comprising a restrictor in operable communication with the diversion bore of the diverter to facilitate maintenance of back pressure.

17. The system according to claim 16, wherein the restrictor comprises an adjustment valve that is used to facilitate maintenance of the back pressure within the processing system when the flowable material is being diverted by the diversion bore in the piston of the diverter.

18. The system according to claim 15, further comprising a condenser device in operable communication with the diversion bore of the diverter to compress the flowable material being diverted.

19. The system according to claim 5, further comprising a first filtration device that is securable in the first bore in the first section of the elongate body of the slide plate and a second filtration device that is securable in the second bore in the second section of the elongate body of the slide plate, the first filtration device being aligned with the main supply feed bore to filter the flowable material and the second filtration device being removable from the second bore for cleaning and/or replacement when the slide plate is in the first position and the second filtration device being aligned with the main supply feed bore to filter the flowable material and the first filtration device being removable from the second bore for cleaning and/or replacement when the slide plate is in the second position.

20. A die changer for changing of dies in and out of an extrusion line, the die changer comprising:
    a die changer housing having a main supply feed bore therethrough for directing a flowable material and a channel oriented transversely to the main supply feed bore; and
    a slide plate movable through the channel and transverse to a direction of flow through the bore, the slide plate comprising an upstream slide plate surface, a downstream slide plate surface, and an elongate body having a first section and a second section, a first bore extending through the first section of the elongate body of the slide plate and a second bore extending through the second section of the elongate body of the slide plate; and
    the slide plate of the die changer being movable within the channel of the die changer housing between a first position where the first bore in the first section of the elongate body of the slide plate is aligned with the main supply feed bore so that the flowable material is directed through the first bore to a first die and a second position where the second bore in the second section of the elongate body of the slide plate is aligned with the main supply feed bore so that the flowable material is directed through the second bore to a second die.

21. The die changer according to claim 20, further comprising a slide plate shifter that moves the slide plate between the first position and the second position and a controller in communication with the slide plate shifter.

22. The die changer according to claim 21, wherein the slide plate shifter comprises a hydraulic cylinder having an extendable and retractable arm secured to the slide plate to move the slide plate between the first position and the second position.

23. The die changer according to claim 22, further comprising a first end cap on a first end of the slide plate and a second end cap on a second end of the slide plate, the first end cap being engaged by the arm of the hydraulic cylinder of the slide plate shifter to move the slide plate.

24. The die changer according to claim 21, wherein the slide plate shifter comprises at least one rail on which the slide plate rides as the slide plate is moved between the first position and the second position.

25. The die changer according to claim 20, wherein the slide plate comprises a first continuous flow channel surrounding the first bore and a second continuous flow channel surrounding the second bore that permit a heated fluid to circulate through the first and second continuous flow channels to heat the walls of the respective first and second bores.

26. The die changer according to claim 20, further comprising a diverter secured on the upstream side of the die changer housing upstream of the slide plate for diverting flowable material to allow continuous flow of material during a die change operation, wherein the diverter comprises:
 a housing including a diverter housing feed bore alignable with the main supply feed bore of the die changer and a piston aperture that intersect with and is transverse to the diverter housing feed bore;
 a movable piston comprising a piston head configured to slidably fit within the piston aperture, the piston head including a material flow through bore that extends through the piston head and a diversion bore, the piston head being movable to a flow through position such that the material flow through bore is alignable with the diverter housing feed bore and the piston head being movable to a diversion position such that the diversion bore is alignable with a portion of the diverter housing feed bore that receives flowable material from upstream in the flowable material processing system to divert the flowable material from upstream in the flowable material processing system out of the flowable material processing system before flow of material reaches the slide plate of the die changer.

27. The system according to claim 26, further comprising a restrictor in operable communication with the diversion bore of the diverter to facilitate maintenance of back pressure.

28. The system according to claim 27, wherein the restrictor comprises an adjustment valve that is used to facilitate maintenance of the back pressure within the processing system when the flowable material is being diverted by the diversion bore in the piston of the diverter.

29. The system according to claim 26, further comprising a condenser device in operable communication with the diversion bore of the diverter to compress the flowable material being diverted.

30. The system according to claim 20, further comprising a first filtration device that is securable in the first bore in the first section of the elongate body of the slide plate and a second filtration device that is securable in the second bore in the second section of the elongate body of the slide plate, the first filtration device being aligned with the main supply feed bore to filter the flowable material and the second filtration device being removable from the second bore for cleaning and/or replacement when the slide plate is in the first position and the second filtration device being aligned with the main supply feed bore to filter the flowable material and the first filtration device being removable from the second bore for cleaning and/or replacement when the slide plate is in the second position.

\* \* \* \* \*